US008179470B2

(12) United States Patent
Chen et al.

(10) Patent No.: US 8,179,470 B2
(45) Date of Patent: May 15, 2012

(54) IMAGE-CAPTURING LENS ASSEMBLY

(75) Inventors: Chun Shan Chen, Taichung (TW); Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 247 days.

(21) Appl. No.: 12/787,239

(22) Filed: May 25, 2010

(65) Prior Publication Data

US 2011/0115962 A1 May 19, 2011

(30) Foreign Application Priority Data

Nov. 13, 2009 (TW) ............................... 98138556 A

(51) Int. Cl.
*H04N 5/225* (2006.01)

(52) U.S. Cl. ......... 348/335; 348/360; 348/362; 359/715

(58) Field of Classification Search .................. 348/335, 348/360–362; 359/715, 771, 772
See application file for complete search history.

(56) References Cited

U.S. PATENT DOCUMENTS 6,130,714 A * 10/2000 Abe et al. ...................... 348/335
7,145,736 B2 12/2006 Noda
7,365,920 B2 4/2008 Noda
7,609,313 B2 * 10/2009 Yamaguchi et al. .......... 348/335
2004/0135917 A1 * 7/2004 Mihara ......................... 348/335
2005/0253952 A1 * 11/2005 Minefuji ....................... 348/335
2010/0097709 A1 * 4/2010 Tsai ............................. 359/715
2010/0149404 A1 * 6/2010 Imamura et al. .............. 348/335

* cited by examiner

*Primary Examiner* — Tuan Ho
*Assistant Examiner* — Kent Wong
(74) *Attorney, Agent, or Firm* — Morris Manning & Martin LLP; Tim Tingkang Xia, Esq.

(57) ABSTRACT

This invention provides an image-capturing lens assembly comprising, in order from an object side to an image side: a first lens element with positive refractive power having a convex object-side surface; a second lens element with negative refractive power; a third lens element with positive refractive power having a concave object-side surface and a convex image-side surface, the object-side and image-side surfaces thereof being aspheric; a fourth lens element with negative refractive power having a concave image-side surface on which at least one inflection point is formed, the object-side and image-side surfaces thereof being aspheric; and a stop disposed between an imaged object and the first lens element; wherein there are four lens elements with refractive power. Such an arrangement of optical elements can effectively reduce the size of the lens assembly, mitigate the sensitivity of the optical system and enable the lens assembly to obtain a higher resolution.

21 Claims, 25 Drawing Sheets

| TABLE 1 | | | | | | | |
|---|---|---|---|---|---|---|---|
| (Embodiment 1) | | | | | | | |
| f = 3.53 mm, Fno = 2.85, HFOV = 32.5 deg. | | | | | | | |
| Surface # | | Curvature Radius | Thickness | Material | Index | Abbe # | Focal length |
| 0 | Object | Plano | Infinity | | | | |
| 1 | Stop | Plano | -0.170 | | | | |
| 2 | Lens 1 | 1.15723 (ASP) | 0.462 | Plastic | 1.544 | 55.9 | 2.11 |
| 3 | | -100.00000 (ASP) | 0.076 | | | | |
| 4 | Lens 2 | -100.00000 (ASP) | 0.300 | Plastic | 1.632 | 23.4 | -3.37 |
| 5 | | 2.17592 (ASP) | 0.641 | | | | |
| 6 | Lens 3 | -1.14350 (ASP) | 0.572 | Plastic | 1.544 | 55.9 | 10.67 |
| 7 | | -1.12371 (ASP) | 0.040 | | | | |
| 8 | Lens 4 | 1.27740 (ASP) | 0.437 | Plastic | 1.544 | 55.9 | -29.54 |
| 9 | | 1.04069 (ASP) | 0.300 | | | | |
| 10 | IR-Filter | Plano | 0.300 | Glass | 1.517 | 64.2 | - |
| 11 | | Plano | 0.998 | | | | |
| 12 | Image | Plano | | | | | |

Fig.7

| TABLE 2 | | | | |
|---|---|---|---|---|
| Surface # | 2 | 3 | 4 | 5 |
| k = | -6.42919E-01 | 1.50000E+02 | -1.50000E+02 | 4.46238E+00 |
| A4 = | 6.33165E-02 | 9.38103E-02 | 1.72098E-01 | 1.65095E-01 |
| A6 = | -3.00818E-02 | -4.71488E-01 | -7.25082E-01 | -2.87917E-01 |
| A8 = | 3.64614E-01 | 1.03643E+00 | 1.52901E+00 | 5.54954E-01 |
| A10= | -7.01205E-01 | -2.02800E+00 | -2.19995E+00 | -2.10756E-01 |
| A12= | | 1.48611E-01 | 1.47704E-01 | 1.70869E-01 |
| Surface # | 6 | 7 | 8 | 9 |
| k = | -1.30739E+01 | -5.13069E-02 | -1.25924E+01 | -7.09967E+00 |
| A4 = | -5.25212E-01 | -8.00855E-02 | -2.31506E-01 | -1.62263E-01 |
| A6 = | 7.10793E-02 | 1.29421E-01 | 1.17137E-01 | 6.32984E-02 |
| A8 = | 1.52544E-01 | -1.56192E-01 | -2.31099E-02 | -2.15360E-02 |
| A10= | -2.80616E-01 | 1.21439E-01 | 1.15947E-03 | 4.13294E-03 |
| A12= | -3.01174E-01 | | 1.28257E-04 | -2.43215E-04 |
| A14= | -1.72078E-01 | | | -9.36992E-06 |

Fig.8

| TABLE 3 | | | | | | | |
|---|---|---|---|---|---|---|---|
| (Embodiment 2) | | | | | | | |
| f = 2.91 mm, Fno = 2.40, HFOV = 31.6 deg. | | | | | | | |
| Surface # | | Curvature Radius | Thickness | Material | Index | Abbe # | Focal length |
| 0 | Object | Plano | Infinity | | | | |
| 1 | Stop | Plano | -0.155 | | | | |
| 2 | Lens 1 | 1.16353 (ASP) | 0.557 | Plastic | 1.544 | 55.9 | 1.75 |
| 3 | | -4.32840 (ASP) | 0.049 | | | | |
| 4 | Lens 2 | -6.94670 (ASP) | 0.300 | Plastic | 1.632 | 23.4 | -2.77 |
| 5 | | 2.38406 (ASP) | 0.475 | | | | |
| 6 | Lens 3 | -1.36537 (ASP) | 0.459 | Plastic | 1.544 | 55.9 | 3.15 |
| 7 | | -0.84950 (ASP) | 0.080 | | | | |
| 8 | Lens 4 | 2.12058 (ASP) | 0.417 | Plastic | 1.544 | 55.9 | -3.18 |
| 9 | | 0.88698 (ASP) | 0.200 | | | | |
| 10 | IR-Filter | Plano | 0.300 | Glass | 1.517 | 64.2 | - |
| 11 | | Plano | 0.619 | | | | |
| 12 | Image | Plano | | | | | |

Fig.9

| TABLE 4 | | | | |
|---|---|---|---|---|
| Surface # | 2 | 3 | 4 | 5 |
| k = | -1.11360E+00 | -4.70980E+01 | -1.50000E+02 | 9.23249E+00 |
| A4 = | 8.40707E-02 | 3.97388E-01 | 5.76709E-01 | 2.77559E-01 |
| A6 = | -1.32104E-01 | -2.39455E+00 | -2.92534E+00 | -1.03719E+00 |
| A8 = | 5.02153E-01 | 5.65034E+00 | 6.91366E+00 | 2.14699E+00 |
| A10= | -1.02866E+00 | -8.56568E+00 | -9.45469E+00 | -3.26774E+00 |
| A12= | | 5.37645E+00 | 6.34390E+00 | 2.95243E+00 |
| Surface # | 6 | 7 | 8 | 9 |
| k = | -1.52614E+01 | -2.68828E-01 | -4.73516E+01 | -7.22722E+00 |
| A4 = | -4.93298E-01 | 1.26292E-01 | -4.70225E-01 | -3.19151E-01 |
| A6 = | 5.36629E-01 | 2.78898E-01 | 4.02978E-01 | 2.52162E-01 |
| A8 = | -1.61145E+00 | -8.06132E-01 | -1.46495E-01 | -1.58321E-01 |
| A10= | 4.39183E-01 | 9.48514E-01 | 2.10093E-02 | 5.78582E-02 |
| A12= | 3.79094E+00 | | -3.22556E-04 | -1.10899E-02 |
| A14= | -5.24912E+00 | | | 6.97708E-04 |

Fig.10

| TABLE 5 | | | | | | | |
|---|---|---|---|---|---|---|---|
| (Embodiment 3) | | | | | | | |
| f = 6.14 mm, Fno = 2.83, HFOV = 30.7 deg. | | | | | | | |
| Surface # | | Curvature Radius | Thickness | Material | Index | Abbe # | Focal length |
| 0 | Object | Plano | Infinity | | | | |
| 1 | Stop | Plano | -0.164 | | | | |
| 2 | Lens 1 | 2.54396 (ASP) | 0.734 | Plastic | 1.543 | 56.5 | 5.29 |
| 3 | | 20.00000 (ASP) | 0.409 | | | | |
| 4 | Lens 2 | 26.07120 (ASP) | 0.788 | Plastic | 1.632 | 23.4 | -8.97 |
| 5 | | 4.60250 (ASP) | 0.810 | | | | |
| 6 | Lens 3 | -1.86793 (ASP) | 0.815 | Plastic | 1.543 | 56.5 | 8.55 |
| 7 | | -1.53706 (ASP) | 0.070 | | | | |
| 8 | Lens 4 | 2.52745 (ASP) | 0.872 | Plastic | 1.530 | 55.8 | -24.51 |
| 9 | | 1.86295 (ASP) | 1.000 | | | | |
| 10 | IR-Filter | Plano | 0.300 | Glass | 1.517 | 64.2 | - |
| 11 | | Plano | 0.500 | | | | |
| 12 | Cover-glass | Plano | 0.500 | Glass | 1.517 | 64.2 | - |
| 13 | | Plano | 0.943 | | | | |
| 14 | Image | Plano | | | | | |

Fig.11

| TABLE 6 | | | | |
|---|---|---|---|---|
| Surface # | 2 | 3 | 4 | 5 |
| k = | -3.47976E-01 | 0.00000E+00 | 0.00000E+00 | 6.99080E+00 |
| A4 = | 4.25673E-03 | -8.05153E-03 | -2.08415E-02 | 2.07537E-03 |
| A6 = | 1.35372E-04 | -3.64034E-03 | -7.24975E-03 | -1.29829E-02 |
| A8 = | -1.35115E-03 | -4.99649E-03 | -5.30303E-03 | 1.31713E-03 |
| A10= | 1.07587E-05 | 2.11887E-03 | 3.80676E-03 | |
| Surface # | 6 | 7 | 8 | 9 |
| k = | -1.88424E+00 | -4.04349E-01 | -1.72421E+00 | -6.96751E+00 |
| A4 = | 8.37974E-02 | 7.78287E-02 | -5.27032E-02 | -2.77034E-02 |
| A6 = | -4.53947E-02 | -1.45086E-02 | 1.24886E-02 | 5.15185E-03 |
| A8 = | 2.24163E-02 | 6.02410E-03 | -2.02875E-03 | -8.61911E-04 |
| A10= | -7.53124E-03 | -5.80460E-04 | 1.64471E-04 | 7.40816E-05 |
| A12= | 6.78953E-04 | 1.09846E-04 | -5.09803E-06 | -2.99565E-06 |
| A14= | | -1.42336E-04 | | |
| A16= | | 3.25797E-05 | | |

Fig.12

| TABLE 7 | | | | | | | |
|---|---|---|---|---|---|---|---|
| (Embodiment 4) | | | | | | | |
| f = 6.47 mm, Fno = 2.85, HFOV = 30.2 deg. | | | | | | | |
| Surface # | | Curvature Radius | Thickness | Material | Index | Abbe # | Focal length |
| 0 | Object | Plano | Infinity | | | | |
| 1 | Stop | Plano | -0.369 | | | | |
| 2 | Lens 1 | 1.90378 (ASP) | 0.730 | Plastic | 1.544 | 55.9 | 3.57 |
| 3 | | 77.42000 (ASP) | 0.084 | | | | |
| 4 | Lens 2 | -53.86710 (ASP) | 0.578 | Plastic | 1.632 | 23.4 | -6.37 |
| 5 | | 4.36760 (ASP) | 1.310 | | | | |
| 6 | Lens 3 | -1.98996 (ASP) | 1.018 | Plastic | 1.530 | 55.8 | 6.97 |
| 7 | | -1.52231 (ASP) | 0.588 | | | | |
| 8 | Lens 4 | 6.57260 (ASP) | 0.482 | Plastic | 1.530 | 55.8 | -6.54 |
| 9 | | 2.21195 (ASP) | 0.759 | | | | |
| 10 | IR-Filter | Plano | 0.300 | Glass | 1.517 | 64.2 | - |
| 11 | | Plano | 1.150 | | | | |
| 12 | Image | Plano | | | | | |

Fig.13

| TABLE 8 | | | | |
|---|---|---|---|---|
| Surface # | 2 | 3 | 4 | 5 |
| k = | -1.22813E-01 | 2.21565E+03 | -2.91758E+03 | 4.64868E+00 |
| A4 = | 2.67752E-03 | -6.70984E-03 | 8.07901E-03 | 2.97196E-02 |
| A6 = | -1.15279E-03 | -9.96220E-03 | -9.33042E-03 | 1.02219E-02 |
| A8 = | 9.66143E-04 | 8.54680E-03 | 1.17685E-02 | -6.97294E-03 |
| A10= | -1.39901E-03 | -7.50314E-04 | -1.13203E-04 | 9.89137E-03 |
| Surface # | 6 | 7 | 8 | 9 |
| k = | -1.71330E+00 | -6.79548E-01 | -2.01022E+02 | -1.19710E+01 |
| A4 = | -5.16231E-02 | 1.52342E-02 | -2.74718E-02 | -2.43641E-02 |
| A6 = | -1.71638E-02 | -6.75015E-03 | 3.59227E-03 | 2.49836E-03 |
| A8 = | 2.19309E-04 | 9.72277E-05 | -9.06487E-05 | -2.22837E-04 |
| A10= | 1.10610E-03 | 1.19562E-04 | -1.43687E-05 | 7.87237E-06 |
| A12 = | -9.03958E-04 | 8.73689E-05 | -4.12912E-07 | 1.90846E-07 |
| A14= | -2.13267E-04 | 6.45532E-06 | 8.56180E-08 | -2.23224E-08 |
| A16= | 6.08594E-05 | -4.41126E-06 | 1.59294E-09 | -1.54523E-09 |

Fig.14

| TABLE 9 | | | | | | | |
|---|---|---|---|---|---|---|---|
| (Embodiment 5) | | | | | | | |
| f = 3.41 mm, Fno = 2.85, HFOV = 33.3 deg. | | | | | | | |
| Surface # | | Curvature Radius | Thickness | Material | Index | Abbe # | Focal length |
| 0 | Object | Plano | Infinity | | | | |
| 1 | Stop | Plano | -0.156 | | | | |
| 2 | Lens 1 | 1.18918 (ASP) | 0.405 | Plastic | 1.544 | 55.9 | 2.50 |
| 3 | | 8.33330 (ASP) | 0.175 | | | | |
| 4 | Lens 2 | -12.50000 (ASP) | 0.280 | Plastic | 1.632 | 23.4 | -4.58 |
| 5 | | 3.79870 (ASP) | 0.690 | | | | |
| 6 | Lens 3 | -1.57509 (ASP) | 0.574 | Plastic | 1.544 | 55.9 | 6.97 |
| 7 | | -1.25599 (ASP) | 0.100 | | | | |
| 8 | Lens 4 | 1.52768 (ASP) | 0.604 | Plastic | 1.544 | 55.9 | -12.81 |
| 9 | | 1.07844 (ASP) | 0.500 | | | | |
| 10 | IR-Filter | Plano | 0.300 | Glass | 1.517 | 64.2 | - |
| 11 | | Plano | 0.526 | | | | |
| 12 | Image | Plano | | | | | |

Fig.15

| TABLE 10 | | | | |
|---|---|---|---|---|
| Surface # | 2 | 3 | 4 | 5 |
| k = | -5.02614E-01 | -1.50000E+02 | 1.50000E+02 | -5.74592E+00 |
| A4 = | 7.22144E-02 | 7.51465E-02 | 5.32394E-02 | 1.69836E-01 |
| A6 = | 7.88749E-02 | -2.12453E-01 | -4.31856E-01 | -2.08627E-01 |
| A8 = | -4.97638E-03 | 7.13995E-01 | 8.56025E-01 | 5.47252E-01 |
| A10= | 1.81975E-02 | -2.36465E+00 | -2.41175E+00 | -1.08967E+00 |
| A12= | | 1.79673E+00 | 1.56621E+00 | 1.27440E+00 |
| Surface # | 6 | 7 | 8 | 9 |
| k = | -1.17677E+01 | -1.51518E-02 | -1.04599E+01 | -4.35387E+00 |
| A4 = | -2.17375E-01 | -1.15059E-01 | -1.85038E-01 | -1.32825E-01 |
| A6 = | -6.82295E-02 | 2.15736E-01 | 9.64725E-02 | 6.02993E-02 |
| A8 = | 5.04663E-02 | -2.23675E-01 | -2.31306E-02 | -2.13396E-02 |
| A10= | -6.46914E-02 | 1.09375E-01 | 2.83629E-03 | 4.26604E-03 |
| A12= | 6.22282E-02 | | -1.71437E-04 | -3.71438E-04 |
| A14= | -8.02915E-02 | | | 3.86779E-06 |

Fig.16

| TABLE 11 | | | | | | | |
|---|---|---|---|---|---|---|---|
| (Embodiment 6) | | | | | | | |
| f = 4.23 mm, Fno = 2.44, HFOV = 40.1 deg. | | | | | | | |
| Surface # | | Curvature Radius | Thickness | Material | Index | Abbe # | Focal length |
| 0 | Object | Plano | Infinity | | | | |
| 1 | Stop | Plano | 0.009 | | | | |
| 2 | Lens 1 | 5.65700 (ASP) | 0.975 | Plastic | 1.544 | 55.9 | 2.71 |
| 3 | | -1.87738 (ASP) | 0.142 | | | | |
| 4 | Lens 2 | -13.40030 (ASP) | 0.350 | Plastic | 1.632 | 23.4 | -4.76 |
| 5 | | 3.91390 (ASP) | 0.772 | | | | |
| 6 | Lens 3 | -1.02115 (ASP) | 0.649 | Plastic | 1.544 | 55.9 | 11.61 |
| 7 | | -1.07591 (ASP) | 0.092 | | | | |
| 8 | Lens 4 | 1.83377 (ASP) | 0.823 | Plastic | 1.530 | 55.8 | -51.63 |
| 9 | | 1.45142 (ASP) | 1.000 | | | | |
| 10 | IR-Filter | Plano | 0.300 | Glass | 1.517 | 64.2 | - |
| 11 | | Plano | 1.802 | | | | |
| 12 | Image | Plano | | | | | |

Fig.17

| TABLE 12A | | | | |
|---|---|---|---|---|
| Surface # | 2 | 3 | 4 | 5 |
| k = | -6.49267E+01 | -3.20345E+00 | -1.00000E+00 | -1.00000E+00 |
| A4 = | -7.80057E-03 | -4.72748E-02 | 2.70796E-02 | 2.31052E-02 |
| A6 = | -5.78615E-02 | -4.98288E-02 | -1.15445E-01 | -8.17586E-02 |
| A8 = | -2.00354E-03 | -1.78677E-02 | 1.17086E-01 | 7.25873E-02 |
| A10= | 1.24516E-02 | 1.03463E-01 | -4.02783E-02 | -3.33421E-02 |
| A12= | -2.53434E-02 | -9.12520E-02 | | 4.86364E-03 |
| A14= | 2.43036E-03 | 2.14818E-02 | | |
| Surface # | 6 | 7 | 9 | |
| k = | -2.87870E+00 | -5.94632E-01 | -6.00439E+00 | |
| A4 = | -4.29168E-02 | 7.50235E-02 | -3.74873E-02 | |
| A6 = | -4.98083E-03 | -5.27851E-03 | 9.08234E-03 | |
| A8 = | 3.41464E-02 | 7.81212E-03 | -1.57635E-03 | |
| A10= | -9.68880E-03 | 3.86748E-03 | 1.40559E-04 | |
| A12= | 4.69614E-04 | | -6.16627E-06 | |

Fig.18A

| TABLE 12B | |
|---|---|
| Aspheric Coefficients | |
| Surface # | 8 |
| k = | -5.86152E+00 |
| A1 = | |
| A2 = | |
| A3 = | |
| A4 = | -4.24508E-02 |
| A5 = | |
| A6 = | 1.24798E-02 |
| A7 = | |
| A8 = | -2.11472E-03 |
| A9 = | |
| A10= | 1.27673E-04 |

Fig.18B

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 3.53 | 2.91 | 6.14 | 6.47 | 3.41 | 4.23 |
| Fno | 2.85 | 2.40 | 2.83 | 2.85 | 2.85 | 2.44 |
| HFOV | 32.5 | 31.6 | 30.7 | 30.2 | 33.3 | 40.1 |
| V1-V2 | 32.5 | 32.5 | 33.1 | 32.5 | 32.5 | 32.5 |
| \|N1-N2\| | 0.088 | 0.088 | 0.089 | 0.088 | 0.088 | 0.088 |
| (T12/f)*100 | 2.2 | 1.7 | 6.7 | 1.3 | 5.1 | 3.4 |
| (CT3/f)*100 | 16.2 | 15.8 | 13.3 | 15.7 | 16.8 | 15.3 |
| (CT2/f)*TTL [mm] | 0.34 | 0.35 | 0.96 | 0.62 | 0.33 | 0.49 |
| R1/f | 0.33 | 0.40 | 0.41 | 0.29 | 0.35 | 1.34 |
| R3/R4 | -45.96 | -2.91 | 5.66 | -12.33 | -3.29 | -3.42 |
| f/f1 | 1.67 | 1.66 | 1.16 | 1.81 | 1.36 | 1.56 |
| f/f3 | 0.33 | 0.92 | 0.72 | 0.93 | 0.49 | 0.36 |
| f/f4 | -0.12 | -0.92 | -0.25 | -0.99 | -0.27 | -0.08 |
| SL/TTL | 0.96 | 0.95 | 0.98 | 0.95 | 0.96 | 1.00 |
| (Td/Imgh)*f [mm] | 3.93 | 3.80 | 7.67 | 8.12 | 4.25 | 4.51 |
| TTL/ImgH | 1.78 | 1.87 | 2.08 | 1.81 | 1.79 | 1.65 |

Fig.19

IMAGE-CAPTURING LENS ASSEMBLY

CROSS-REFERENCE TO RELATED APPLICATIONS

This non-provisional application claims priority under 35 U.S.C. §119(a) on Patent Application No(s). 098138556 filed in Taiwan, R.O.C. on Nov. 13, 2009, the entire contents of which are hereby incorporated by reference.

BACKGROUND OF THE INVENTION

1. Field of the Invention

The present invention relates to an image-capturing lens assembly, and more particularly, to a compact image-capturing lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS (Complementary Metal Oxide Semiconductor Sensor). Furthermore, as advanced semiconductor manufacturing technology has allowed the pixel size of sensors to be reduced and electronic devices have become more compact and powerful, there is an increasing demand for compact imaging lenses featuring better image quality.

Generally, a conventional imaging lens for mobile phone cameras, such as the one disclosed in U.S. Pat. No. 7,145,736, is of a triplet type comprising, in order from the object side to the image side: a first lens element with positive refractive power; a second lens element with negative refractive power; and a third lens element with positive refractive power. However, the three-element lens has become insufficient for a high-end imaging lens module due to the reduction in the pixel size of sensors and the increasing demand for lens assemblies featuring better image quality.

U.S. Pat. No. 7,365,920 has disclosed a four lens element assembly where a doublet is formed by adhering the glass spherical surfaces of the first and second lens elements and thereby to correct the chromatic aberration. Such an arrangement of optical elements, however, has the following disadvantages: (1) the freedom of the system is curtailed due to the employment of excess number of spherical glass lenses, thus the total track length of the system cannot be reduced easily; (2) the process of adhering the glass lenses together is complicated, posing difficulties in manufacture.

Therefore, a need exists in the art for an image-capturing lens assembly that requires simple manufacturing process, maintains a moderate total track length and is applicable to high-resolution mobile phone cameras.

SUMMARY OF THE INVENTION

The present invention provides an image-capturing lens assembly comprising, in order from an object side to an image side: a first lens element with positive refractive power having a convex object-side surface; a second lens element with negative refractive power; a third lens element with positive refractive power having a concave object-side surface and a convex image-side surface, the object-side and image-side surfaces thereof being aspheric; a fourth lens element with negative refractive power having a concave image-side surface on which at least one inflection point is formed, the object-side and image-side surfaces thereof being aspheric; and a stop disposed between an imaged object and the first lens element; wherein there are four lens elements with refractive power; and wherein the focal length of the image-capturing lens assembly is f, the focal length of the third lens element is f3, the focal length of the fourth lens element is f4, the refractive index of the first lens element is N1, the refractive index of the second lens element is N2, the thickness of the second lens element near the optical axis is CT2, the thickness of the third lens element near the optical axis is CT3, the Abbe number of the first lens element is V1, the Abbe number of the second lens element is V2, the radius of curvature of the object-side surface of the first lens element is R1, the total track length of the image-capturing lens assembly is TTL, the distance near the optical axis between the stop and the image plane is SL, and they satisfy the relations: $0.00<f/f3<0.95$, $-1.00<f/f4<-0.01$, $|N1-N2|<0.12$, $3.0<(CT3/f)*100<20.0$, $30.5<V1-V2<42.0$, $0.20<R1/f<0.60$, $0.20\text{ mm}<(CT2/f)*TTL<0.73\text{ mm}$, $0.93<SL/TTL<1.07$.

The present invention provides another image-capturing lens assembly comprising, in order from the object side to the image side: a first lens element with positive refractive power having a convex object-side surface and a concave image-side surface; a second lens element with negative refractive power having a concave image-side surface; a third lens element with positive refractive power having a concave object-side surface and a convex image-side surface, the object-side and image-side surfaces thereof being aspheric; a fourth lens element with negative refractive power having a concave image-side surface on which at least one inflection point is formed, the object-side and image-side surfaces thereof being aspheric; and a stop disposed between an imaged object and the second lens element; wherein there are four lens elements with refractive power; and wherein the focal length of the image-capturing lens assembly is f, the focal length of the third lens element is f3, the focal length of the fourth lens element is f4, the refractive index of the first lens element is N1, the refractive index of the second lens element is N2, and they satisfy the relations: $0.00<f/f3<0.95$, $-1.00<f/f4<-0.01$, $|N1-N2|<0.12$.

Such an arrangement of optical elements can effectively reduce the size of the lens assembly, mitigate the sensitivity of the optical system and enable the lens assembly to obtain a higher resolution.

In the present image-capturing lens assembly, the first lens element has positive refractive power so that the total track length of the image-capturing lens assembly can be effectively reduced; the second lens element has negative refractive power so that the chromatic aberration of the system can be favorably corrected; the third lens element has positive refractive power so that the refractive power of the first lens element can be effectively distributed in order to lower the sensitivity of the system; the fourth lens element with negative refractive power and the third lens element with positive refractive power form a telephoto structure so that the back focal length of the system can be favorably reduced, thereby reducing the total track length.

In the present image-capturing lens assembly, the first lens element may be a bi-convex lens element or a meniscus lens element having a convex object-side surface and a concave image-side surface. When the first lens element is a bi-convex lens element, the refractive power thereof can be effectively enhanced, thus reducing the total track length of the image-capturing lens assembly. When the first lens element is a meniscus lens element, the astigmatism of the system can be corrected more favorably. The second lens element may have a concave image-side surface so as to favorably extend the back focal length of the system, thereby providing sufficient space to accommodate other components. When the object-side and image-side surfaces of the second lens element are both concave, such a configuration facilitates correcting the Petzval Sum and extending the back focal length of the system. The third lens element has a concave object-side surface and a convex image-side surface so as to favorably correct the astigmatism of the system. The fourth lens element may be a meniscus lens element having a convex object-side surface and a concave image-side surface, or a bi-concave lens element. When the fourth lens element is a meniscus lens element, the astigmatism and high order aberrations of the system can be corrected more favorably. When the fourth lens element is a bi-concave lens element, the principal point of the optical system can be positioned far away from the image plane, thereby the total track length of the system can be favorably reduced to keep the lens assembly compact.

In the present image-capturing lens assembly, the stop may be disposed between an imaged object and the first or second lens element. The first lens element provides positive refractive power, and the stop is disposed near the object side of the image-capturing lens assembly, thereby the total track length of the image-capturing lens assembly can be reduced effectively. The aforementioned arrangement also enables the exit pupil of the image-capturing lens assembly to be positioned far away from the image plane, thus light will be projected onto the electronic sensor at a nearly perpendicular angle, and this is the telecentric feature of the image side. The telecentric feature is very important to the photo sensing ability of the current solid-state sensor as it can improve the photosensitivity of the sensor to reduce the occurrence of shading. Moreover, the fourth lens element is provided with at least one inflection point, thereby the angle of incidence onto the sensor from the off-axis field can be effectively reduced to further correct the off-axis aberrations. In addition, for an optical system with a wide field of view, it requires special effort to correct the distortion and chromatic aberration of magnification, and the correction can be made by placing the stop in a location where the refractive power of the system is balanced. Such a stop placement also helps to mitigate the sensitivity of the system. In other words, when the stop is disposed near the imaged object, the telecentric feature is emphasized and this enables a shorter total track length. When the stop is disposed near the second lens element, the emphasis is on the wide field of view so that the sensitivity of the system can be effectively reduced.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the optical data of the fourth embodiment.

FIG. 14 is TABLE 8 which lists the aspheric surface data of the fourth embodiment.

FIG. 15 is TABLE 9 which lists the optical data of the fifth embodiment.

FIG. 16 is TABLE 10 which lists the aspheric surface data of the fifth embodiment.

FIG. 17 is TABLE 11 which lists the optical data of the sixth embodiment.

FIGS. 18A and 18B are TABLES 12A and 12B which list the aspheric surface data of the sixth embodiment.

FIG. 19 is TABLE 13 which lists the data of the respective embodiments resulting from the equations.

DETAILED DESCRIPTION OF THE PREFERRED EMBODIMENTS

Figure 1A:
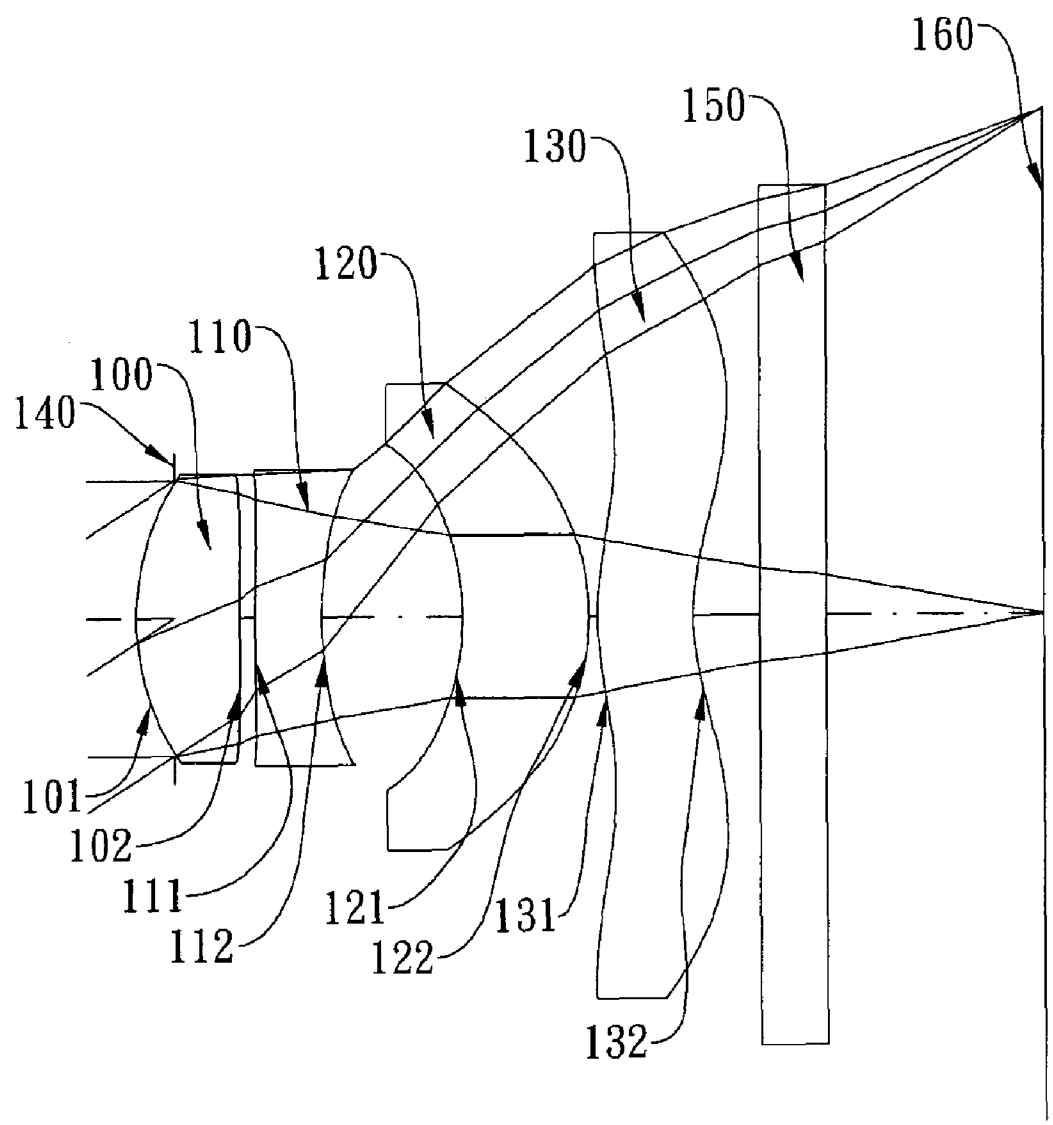
FIG. 1A shows an image-capturing lens assembly in accordance with a first embodiment of the present invention.

The present invention provides an image-capturing lens assembly comprising, in order from an object side to an image side: a first lens element with positive refractive power having a convex object-side surface; a second lens element with negative refractive power; a third lens element with positive refractive power having a concave object-side surface and a convex image-side surface, the object-side and image-side surfaces thereof being aspheric; a fourth lens element with negative refractive power having a concave image-side surface on which at least one inflection point is formed, the object-side and image-side surfaces thereof being aspheric; and a stop disposed between an imaged object and the first lens element; wherein there are four lens elements with refractive power; and wherein the focal length of the image-capturing lens assembly is f, the focal length of the third lens element is $f3$, the focal length of the fourth lens element is $f4$, the refractive index of the first lens element is $N1$, the refractive index of the second lens element is $N2$, the thickness of the second lens element near the optical axis is $CT2$, the thickness of the third lens element near the optical axis is $CT3$, the Abbe number of the first lens element is $V1$, the Abbe number of the second lens element is $V2$, the radius of curvature of the object-side surface of the first lens element is $R1$, the total track length of the image-capturing lens assembly is TTL, the distance near the optical axis between the stop and the image plane is SL, and they satisfy the relations: $0.00<f/f3<0.95$, $-1.00<f/f4<-0.01$, $|N1-N2|<0.12$, $3.0<(CT3/f)*100<20.0$, $30.5<V1-V2<42.0$, $0.20<R1/f<0.60$, $0.20\text{ mm}<(CT2/f)*TTL<0.73\text{ mm}$, $0.93<SL/TTL<1.07$.

When the relation of $0.00<f/f3<0.95$ is satisfied, the refractive power of the first lens element can be effectively distributed while the refractive power of the third lens element will not be too large. Accordingly, the sensitivity of the system can be favorably lowered and the aberrations can be prevented from becoming too large. Preferably, f and f3 satisfy the relation: $0.20<f/f3<0.80$. When the relation of $-1.00<f/f4<-0.01$ is satisfied, the fourth lens element has moderate refractive power so that the telephoto structure formed by the third and fourth lens elements can be maintained effectively. The above relation also facilitates the correction of the high order aberrations of the system. Preferably, f and f4 satisfy the relation: $-0.60<f/f4<-0.10$. When the relation of $|N1-N2|<0.12$ is satisfied, the system's capability to correct the astigmatism can be favorably enhanced. When the relation of $3.0<(CT3/f)*100<20.0$ is satisfied, the thickness of the third lens element is more favorable for the moldability and homogeneity of the plastic-injection-molded lenses. When the relation of $30.5<V1-V2<42.0$ is satisfied, the chromatic aberration of the system can be favorably corrected. When the relation of $0.20<R1/f<0.60$ is satisfied, the total track length of the image-capturing lens assembly can be reduced effectively, and the high order aberrations can be prevented from becoming too large. Preferably, R1 and f satisfy the relation: $0.20<R1/f<0.40$. When the relation of 0.20 mm<(CT2/f)*TTL<0.73 mm is satisfied, the thickness of the second lens element is more favorable for the moldability and homogeneity of the plastic-injection-molded lenses, and the lens elements can be placed closer together to keep the lens assembly compact. Preferably, CT2, f and TTL satisfy the relation: 0.25 mm<(CT2/f)*TTL<0.45 mm. When the relation of $0.93<SL/TTL<1.07$ is satisfied, the telecentric feature of the image-capturing lens assembly can be maintained, thereby effectively reducing the total track length of the system.

In the aforementioned image-capturing lens assembly, it is preferable that the second lens element has a concave image-side surface so as to favorably extend the back focal length of the system, thereby providing sufficient space to accommodate other components. And it will be more preferable that the object-side and image-side surfaces of the second lens element are both concave. Preferably, the fourth lens element has a convex object-side surface so as to effectively correct the astigmatism.

The aforementioned image-capturing lens assembly further comprises an electronic sensor on which an object is imaged. The total track length of the image-capturing lens assembly is TTL, which is defined as the distance near the optical axis between the object-side surface of the first lens element and the electronic sensor, the distance near the optical axis between the object-side surface of the first lens element and the image-side surface of the fourth lens element is Td, and they preferably satisfy the relation: (Td/ImgH)*f<5.2 mm. When the above relation is satisfied, the lens elements can be placed closer together to keep the lens assembly compact.

In the aforementioned image-capturing lens assembly, the focal length of the image-capturing lens assembly is f, the focal length of the first lens element is f1, and they preferably satisfy the relation: $1.25<f/f1<2.00$. When the above relation is satisfied, the refractive power of the first lens element is more balanced so that the total track length of the system can be effectively controlled, enabling the image-capturing lens assembly to maintain a compact form. The above relation also prevents the high order spherical aberration from becoming too large, so that the image quality of the image-capturing lens assembly can be improved. And it will be more preferable that f and f1 satisfy the relation: $1.50<f/f1<1.80$.

In the aforementioned image-capturing lens assembly, the distance near the optical axis between the first and second lens elements is T12, the focal length of the image-capturing lens assembly is f, and they preferably satisfy the relation: $0.5<(T12/f)*100<6.0$. The above relation facilitates the correction of the high order aberrations of the image-capturing lens assembly so that the image quality of the system can be improved.

In the aforementioned image-capturing lens assembly, the radius of curvature of the object-side surface of the second lens element is R3, the radius of curvature of the image-side surface of the second lens element is R4, and they preferably satisfy the relation: $R3/R4<-1.2$. The above relation can effectively extend the back focal length of the system, prevent the total track length of the system from becoming too long, and favorably correct the aberrations of the system.

The aforementioned image-capturing lens assembly further comprises an electronic sensor on which an object is imaged. The total track length of the image-capturing lens assembly is TTL, half of the diagonal length of the effective pixel area of the electronic sensor is ImgH, and they preferably satisfy the relation: $TTL/ImgH<2.0$. The above relation enables the image-capturing lens assembly to maintain a compact form so that it can be installed in compact portable electronic products.

The present invention provides another image-capturing lens assembly comprising, in order from the object side to the image side: a first lens element with positive refractive power having a convex object-side surface and a concave image-side surface; a second lens element with negative refractive power having a concave image-side surface; a third lens element with positive refractive power having a concave object-side surface and a convex image-side surface, the object-side and image-side surfaces thereof being aspheric; a fourth lens element with negative refractive power having a concave image-side surface on which at least one inflection point is formed, the object-side and image-side surfaces thereof being aspheric; and a stop disposed between an imaged object and the second lens element; wherein there are four lens elements with refractive power; and wherein the focal length of the image-capturing lens assembly is f, the focal length of the third lens element is f3, the focal length of the fourth lens element is f4, the refractive index of the first lens element is N1, the refractive index of the second lens element is N2, and they satisfy the relations: $0.00<f/f3<0.95$, $-1.00<f/f4<-0.01$, $|N1-N2|<0.12$.

When the relation of $0.00<f/f3<0.95$ is satisfied, the refractive power of the first lens element can be effectively distributed while the refractive power of the third lens element will not be too large. Accordingly, the sensitivity of the system can be favorably lowered and the aberrations can be prevented from becoming too large. Preferably, f and f3 satisfy the relation: $0.20<f/f3<0.80$. When the relation of $-1.00<f/f4<-0.01$ is satisfied, the fourth lens element has moderate refractive power so that the telephoto structure formed by the third and fourth lens elements can be maintained effectively. The above relation also facilitates the correction of the high order aberrations of the system. Preferably, f and f4 satisfy the relation: $-0.60<f/f4<-0.10$. When the relation of $|N1-N2|<0.12$ is satisfied, the system's capability to correct the astigmatism can be favorably enhanced.

In the aforementioned image-capturing lens assembly, it is preferable that the second lens element has a concave object-side surface so as to favorably extend the back focal length of the system, thereby providing sufficient space to accommodate other components.

In the aforementioned image-capturing lens assembly, the focal length of the image-capturing lens assembly is f, the focal length of the first lens element is f1, and they preferably satisfy the relation: $1.25<f/f1<2.00$. When the above relation is satisfied, the refractive power of the first lens element is more balanced so that the total track length of the system can be effectively controlled, enabling the image-capturing lens assembly to maintain a compact form. The above relation also prevents the high order spherical aberration from becoming too large, so that the image quality of the image-capturing lens assembly can be improved.

In the aforementioned image-capturing lens assembly, the Abbe number of the first lens element is V1, the Abbe number of the second lens element is V2, and they preferably satisfy the relation: 30.5<V1−V2<42.0. When the above relation is satisfied, the chromatic aberration of the system can be favorably corrected.

In the aforementioned image-capturing lens assembly, the thickness of the third lens element near the optical axis is CT3, the focal length of the image-capturing lens assembly is f, and they preferably satisfy the relation: 3.0<(CT3/f)*100<20.0. When the above relation is satisfied, the thickness of the third lens element is more favorable for the moldability and homogeneity of the plastic-injection-molded lenses.

In the aforementioned image-capturing lens assembly, the distance near the optical axis between the first and second lens elements is T12, the focal length of the image-capturing lens assembly is f, and they preferably satisfy the relation: 0.5<(T12/f)*100<6.0. When the above relation is satisfied, the high order aberrations of the image-capturing lens assembly can be favorably corrected to improve the image quality of the system.

In the aforementioned image-capturing lens assembly, the radius of curvature of the object-side surface of the first lens element is R1, the focal length of the image-capturing lens assembly is f, and they preferably satisfy the relation: 0.20<R1/f<0.40. When the above relation is satisfied, the total track length of the image-capturing lens assembly can be effectively reduced. The above relation also prevents the high order aberrations from becoming too large.

The aforementioned image-capturing lens assembly further comprises an electronic sensor on which an object is imaged. The distance near the optical axis between the stop and the image plane is SL, the total track length of the image-capturing lens assembly is TTL, half of the diagonal length of the effective pixel area of the electronic sensor is ImgH, and they preferably satisfy the relations: 0.93<SL/TTL<1.07, TTL/ImgH<2.0. When the relation of 0.93<SL/TTL<1.07 is satisfied, the telecentric feature of the image-capturing lens assembly can be maintained, thereby effectively reducing the total track length of the system. When the relation of TTL/ImgH<2.0 is satisfied, the image-capturing lens assembly can maintain a compact form and be installed in compact portable electronic products.

In the present image-capturing lens assembly, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the image-capturing lens assembly can be reduced effectively.

In the present image-capturing lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
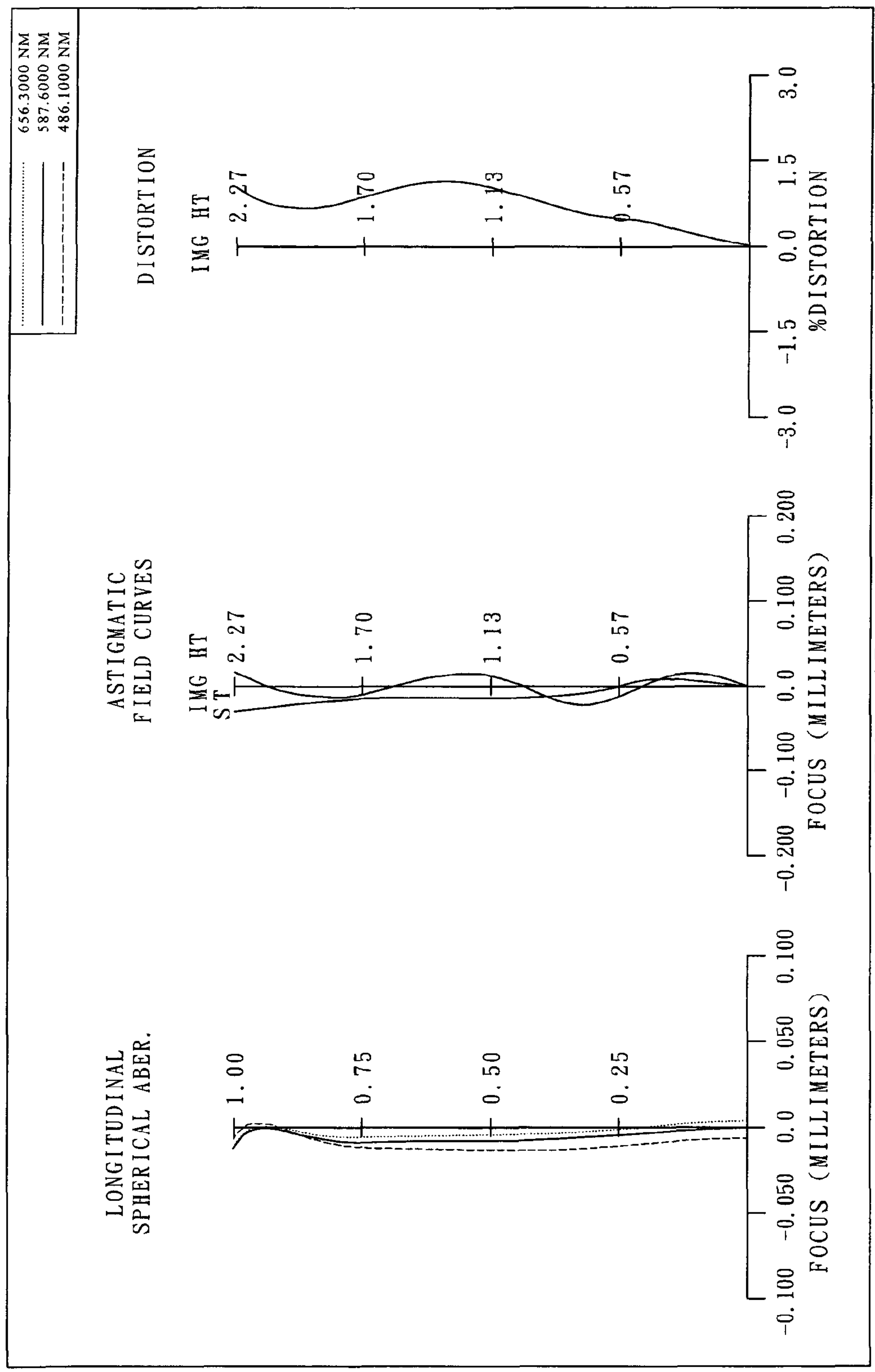
FIG. 1B shows the aberration curves of the first embodiment of the present invention.

FIG. 1A shows an image-capturing lens assembly in accordance with a first embodiment of the present invention, and FIG. 1B shows the aberration curves of the first embodiment of the present invention. The image-capturing lens assembly of the first embodiment of the present invention mainly comprises four lens elements, in order from an object side to an image side: a plastic first lens element 100 with positive refractive power having a convex object-side surface 101 and a convex image-side surface 102, the object-side and image-side surfaces 101 and 102 thereof being aspheric; a plastic second lens element 110 with negative refractive power having a concave object-side surface 111 and a concave image-side surface 112, the object-side and image-side surfaces 111 and 112 thereof being aspheric; a plastic third lens element 120 with positive refractive power having a concave object-side surface 121 and a convex image-side surface 122, the object-side and image-side surfaces 121 and 122 thereof being aspheric; and a plastic fourth lens element 130 with negative refractive power having a convex object-side surface 131 and a concave image-side surface 132 on which at least one inflection point is formed, the object-side and image-side surfaces 131 and 132 thereof being aspheric; wherein a stop 140 is disposed between an imaged object and the first lens element 100; wherein an IR filter 150 is disposed between the image-side surface 132 of the fourth lens element 130 and an image plane 160; and wherein the IR filter 150 is made of glass and has no influence on the focal length of the image-capturing lens assembly.

The equation of the aspheric surface profiles is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image-capturing lens assembly, the focal length of the image-capturing lens assembly is f, and it satisfies the relation: f=3.53 (mm).

In the first embodiment of the present image-capturing lens assembly, the f-number of the image-capturing lens assembly is Fno, and it satisfies the relation: Fno=2.85.

In the first embodiment of the present image-capturing lens assembly, half of the maximal field of view of the image-capturing lens assembly is HFOV, and it satisfies the relation: HFOV=32.5 deg.

In the first embodiment of the present image-capturing lens assembly, the focal length of the image-capturing lens assembly is f, the focal length of the first lens element 100 is f1, and they satisfy the relation: f/f1=1.67.

In the first embodiment of the present image-capturing lens assembly, the focal length of the image-capturing lens assembly is f, the focal length of the third lens element 120 is f3, and they satisfy the relation: f/f3=0.33.

In the first embodiment of the present image-capturing lens assembly, the focal length of the image-capturing lens assembly is f, the focal length of the fourth lens element 130 is f4, and they satisfy the relation: f/f4=−0.12.

In the first embodiment of the present image-capturing lens assembly, the refractive index of the first lens element 100 is N1, the refractive index of the second lens element 110 is N2, and they satisfy the relation: |N1−N2|=0.088.

In the first embodiment of the present image-capturing lens assembly, the thickness of the third lens element 120 near the optical axis is CT3, the focal length of the image-capturing lens assembly is f, and they satisfy the relation: (CT3/f)*100=16.2.

In the first embodiment of the present image-capturing lens assembly, the Abbe number of the first lens element 100 is V1, the Abbe number of the second lens element 110 is V2, and they satisfy the relation: V1−V2=32.5.

In the first embodiment of the present image-capturing lens assembly, the radius of curvature of the object-side surface 101 of the first lens element 100 is R1, the focal length of the image-capturing lens assembly is f, and they satisfy the relation: R1/f=0.33.

In the first embodiment of the present image-capturing lens assembly, the thickness of the second lens element 110 near the optical axis is CT2, the focal length of the image-capturing lens assembly is f, the total track length of the image-capturing lens assembly is TTL, and they satisfy the relation: (CT2/f) TTL=0.34 mm.

In the first embodiment of the present image-capturing lens assembly, the distance near the optical axis between the stop 140 and the image plane 160 is SL, the total track length of the image-capturing lens assembly is TTL, and they satisfy the relation: SL/TTL=0.96.

In the first embodiment of the present image-capturing lens assembly, the image plane 160 is provided with an electronic sensor on which an object is imaged. The distance near the optical axis between the object-side surface 101 of the first lens element 100 and the image-side surface 132 of the fourth lens element 130 is Td, half of the diagonal length of the effective pixel area of the electronic sensor is ImgH, the focal length of the image-capturing lens assembly is f, and they satisfy the relation: (Td/ImgH)*f=3.93 mm.

In the first embodiment of the present image-capturing lens assembly, the distance near the optical axis between the first lens element 100 and the second lens element 110 is T12, the focal length of the image-capturing lens assembly is f, and they satisfy the relation: (T12/f)*100=2.2.

In the first embodiment of the present image-capturing lens assembly, the radius of curvature of the object-side surface 111 of the second lens element 110 is R3, the radius of curvature of the image-side surface 112 of the second lens element 110 is R4, and they satisfy the relation: R3/R4=−45.96.

In the first embodiment of the present image-capturing lens assembly, the image plane 160 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=1.78.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 2A:
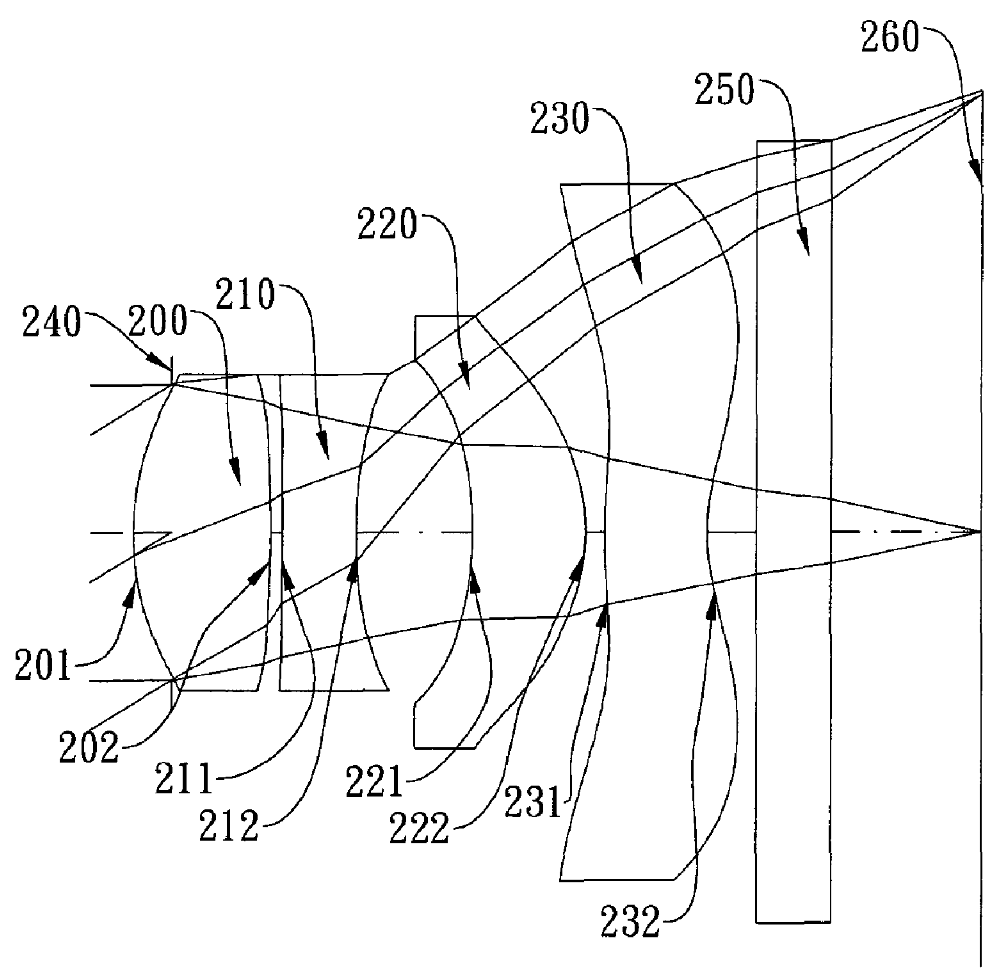
FIG. 2A shows an image-capturing lens assembly in accordance with a second embodiment of the present invention.
Figure 2B:
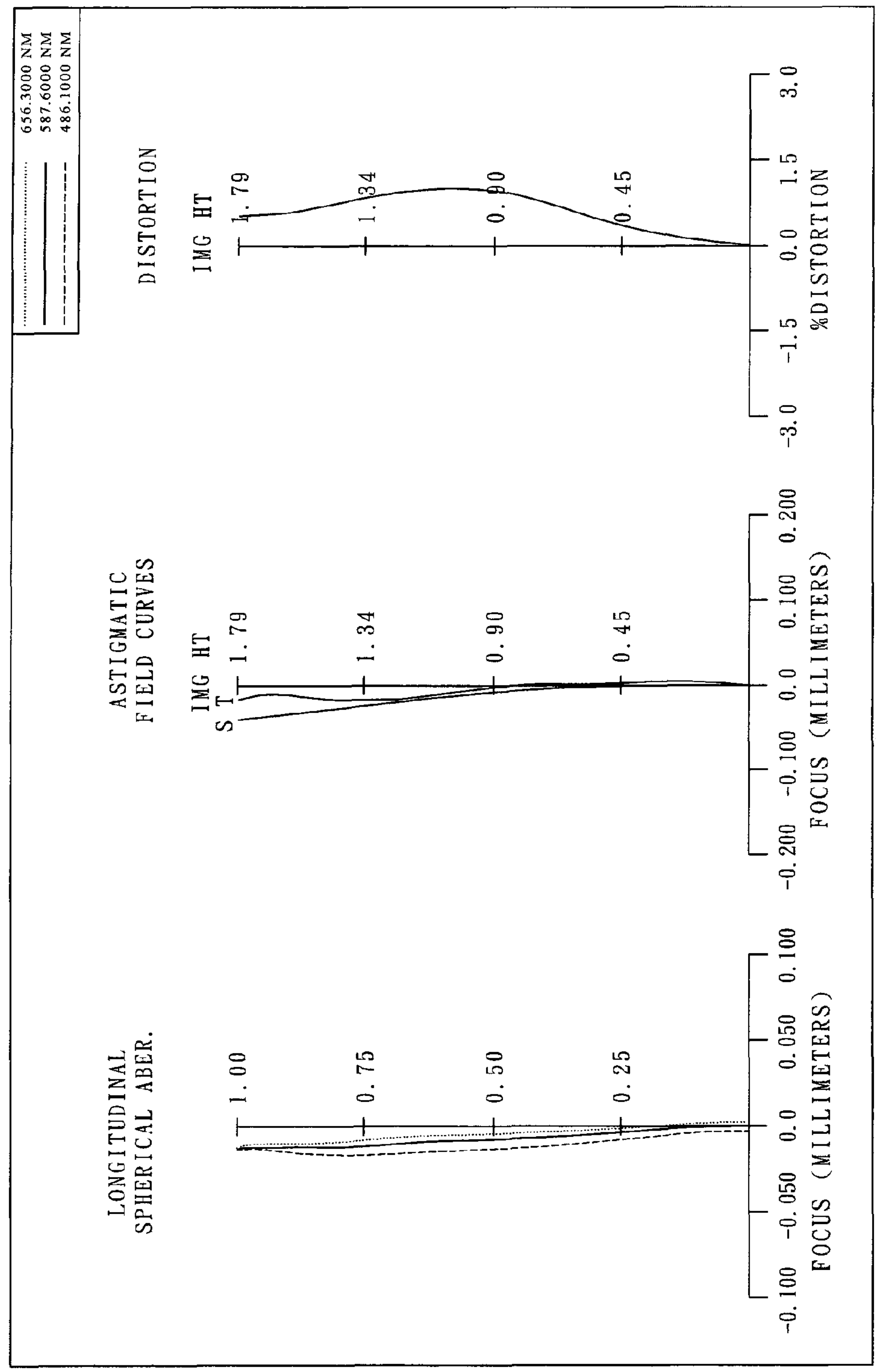
FIG. 2B shows the aberration curves of the second embodiment of the present invention.

FIG. 2A shows an image-capturing lens assembly in accordance with a second embodiment of the present invention, and FIG. 2B shows the aberration curves of the second embodiment of the present invention. The image-capturing lens assembly of the second embodiment of the present invention mainly comprises four lens elements, in order from the object side to the image side: a plastic first lens element 200 with positive refractive power having a convex object-side surface 201 and a convex image-side surface 202, the object-side and image-side surfaces 201 and 202 thereof being aspheric; a plastic second lens element 210 with negative refractive power having a concave object-side surface 211 and a concave image-side surface 212, the object-side and image-side surfaces 211 and 212 thereof being aspheric; a plastic third lens element 220 with positive refractive power having a concave object-side surface 221 and a convex image-side surface 222, the object-side and image-side surfaces 221 and 222 thereof being aspheric; and a plastic fourth lens element 230 with negative refractive power having a convex object-side surface 231 and a concave image-side surface 232 on which at least one inflection point is formed, the object-side and image-side surfaces 231 and 232 thereof being aspheric; wherein a stop 240 is disposed between an imaged object and the first lens element 200; wherein an IR filter 250 is disposed between the image-side surface 232 of the fourth lens element 230 and an image plane 260; and wherein the IR filter 250 is made of glass and has no influence on the focal length of the image-capturing lens assembly.

The equation of the aspheric surface profiles of the second embodiment has the same form as that of the first embodiment.

In the second embodiment of the present image-capturing lens assembly, the focal length of the image-capturing lens assembly is f, and it satisfies the relation: f=2.91 (mm).

In the second embodiment of the present image-capturing lens assembly, the f-number of the image-capturing lens assembly is Fno, and it satisfies the relation: Fno=2.40.

In the second embodiment of the present image-capturing lens assembly, half of the maximal field of view of the image-capturing lens assembly is HFOV, and it satisfies the relation: HFOV=31.6 deg.

In the second embodiment of the present image-capturing lens assembly, the focal length of the image-capturing lens assembly is f, the focal length of the first lens element 200 is f1, and they satisfy the relation: f/f1=1.66.

In the second embodiment of the present image-capturing lens assembly, the focal length of the image-capturing lens assembly is f, the focal length of the third lens element 220 is f3, and they satisfy the relation: f/f3=0.92.

In the second embodiment of the present image-capturing lens assembly, the focal length of the image-capturing lens assembly is f, the focal length of the fourth lens element 230 is f4, and they satisfy the relation: f/f4=−0.92.

In the second embodiment of the present image-capturing lens assembly, the refractive index of the first lens element 200 is N1, the refractive index of the second lens element 210 is N2, and they satisfy the relation: |N1−N2|=0.088.

In the second embodiment of the present image-capturing lens assembly, the thickness of the third lens element 220 near the optical axis is CT3, the focal length of the image-capturing lens assembly is f, and they satisfy the relation: (CT3/f)*100=15.8.

In the second embodiment of the present image-capturing lens assembly, the Abbe number of the first lens element 200 is V1, the Abbe number of the second lens element 210 is V2, and they satisfy the relation: V1−V2=32.5.

In the second embodiment of the present image-capturing lens assembly, the radius of curvature of the object-side surface 201 of the first lens element 200 is R1, the focal length of the image-capturing lens assembly is f, and they satisfy the relation: R1/f=0.40.

In the second embodiment of the present image-capturing lens assembly, the thickness of the second lens element 210 near the optical axis is CT2, the focal length of the image-capturing lens assembly is f, the total track length of the image-capturing lens assembly is TTL, and they satisfy the relation: (CT2/f) TTL=0.35 mm.

In the second embodiment of the present image-capturing lens assembly, the distance near the optical axis between the stop 240 and the image plane 260 is SL, the total track length of the image-capturing lens assembly is TTL, and they satisfy the relation: SL/TTL=0.95.

In the second embodiment of the present image-capturing lens assembly, the image plane 260 is provided with an electronic sensor on which an object is imaged. The distance near the optical axis between the object-side surface 201 of the first lens element 200 and the image-side surface 232 of the fourth lens element 230 is Td, half of the diagonal length of the effective pixel area of the electronic sensor is ImgH, the focal length of the image-capturing lens assembly is f, and they satisfy the relation: (Td/ImgH)*f=3.80 mm.

In the second embodiment of the present image-capturing lens assembly, the distance near the optical axis between the first lens element 200 and the second lens element 210 is T12, the focal length of the image-capturing lens assembly is f, and they satisfy the relation: (T12/f)*100=1.7.

In the second embodiment of the present image-capturing lens assembly, the radius of curvature of the object-side surface 211 of the second lens element 210 is R3, the radius of curvature of the image-side surface 212 of the second lens element 210 is R4, and they satisfy the relation: R3/R4=−2.91.

In the second embodiment of the present image-capturing lens assembly, the image plane 260 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=1.87.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 3A:
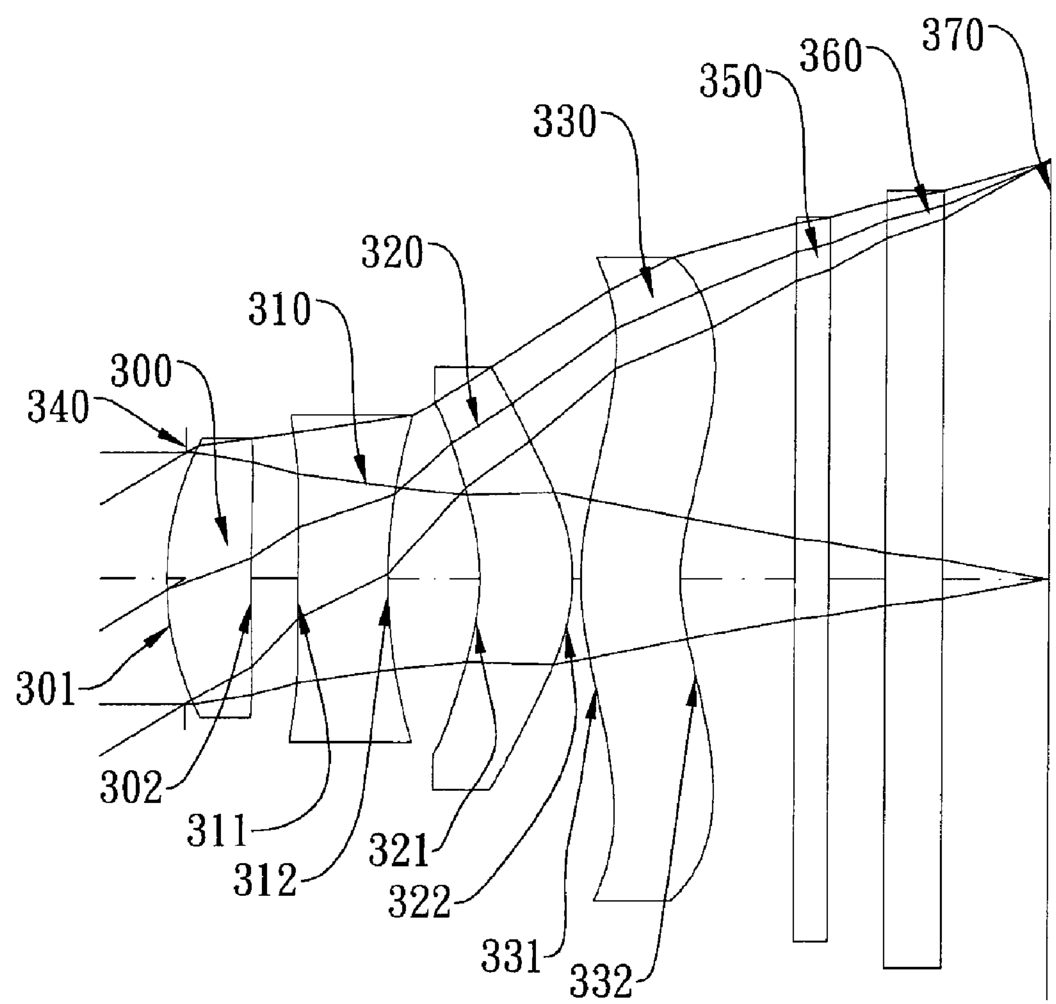
FIG. 3A shows an image-capturing lens assembly in accordance with a third embodiment of the present invention.
Figure 3B:
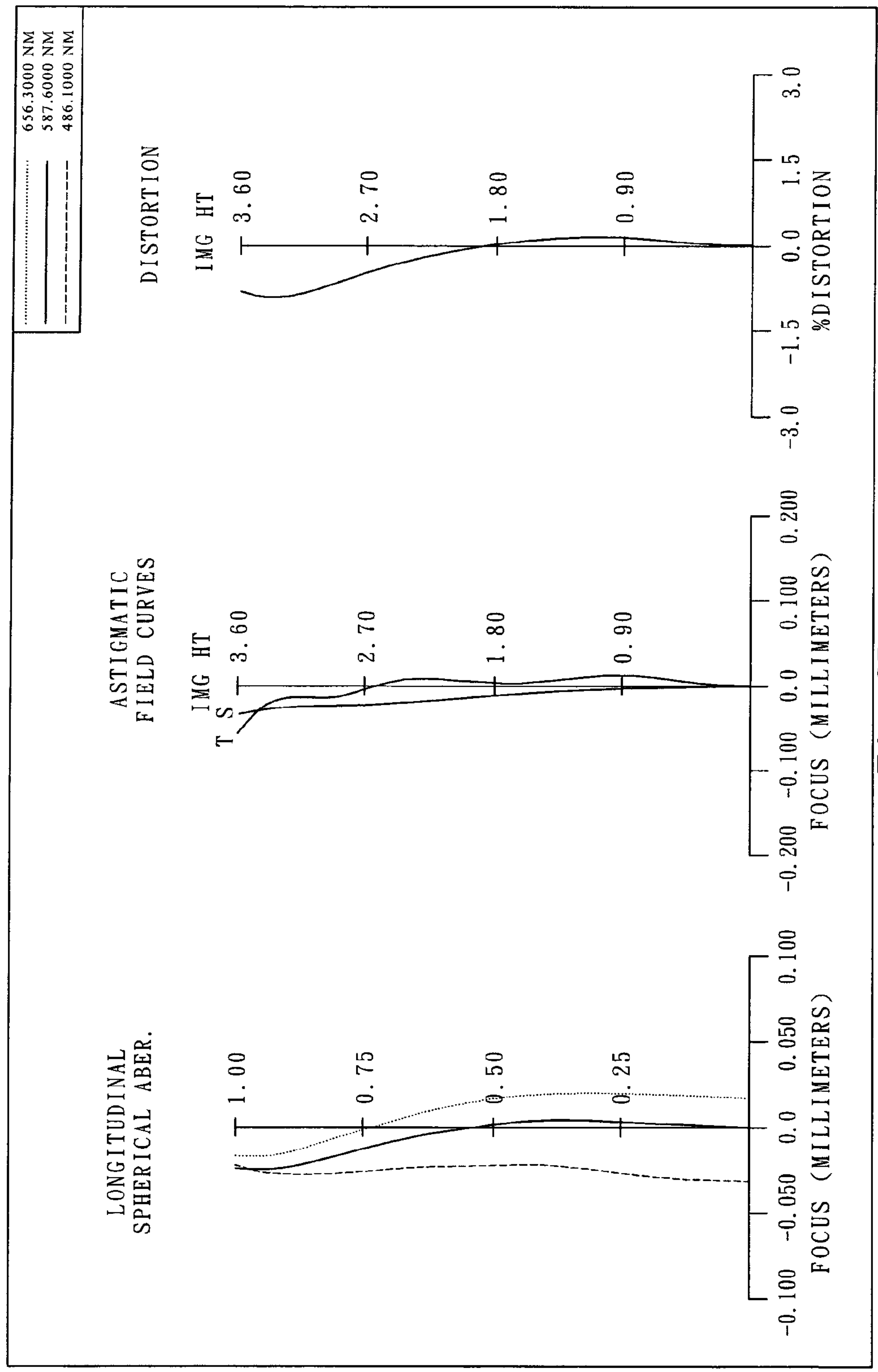
FIG. 3B shows the aberration curves of the third embodiment of the present invention.

FIG. 3A shows an image-capturing lens assembly in accordance with a third embodiment of the present invention, and FIG. 3B shows the aberration curves of the third embodiment of the present invention. The image-capturing lens assembly of the third embodiment of the present invention mainly comprises four lens elements, in order from the object side to the image side: a plastic first lens element 300 with positive refractive power having a convex object-side surface 301 and a concave image-side surface 302, the object-side and image-side surfaces 301 and 302 thereof being aspheric; a plastic second lens element 310 with negative refractive power having a convex object-side surface 311 and a concave image-side surface 312, the object-side and image-side surfaces 311 and 312 thereof being aspheric; a plastic third lens element 320 with positive refractive power having a concave object-side surface 321 and a convex image-side surface 322, the object-side and image-side surfaces 321 and 322 thereof being aspheric; and a plastic fourth lens element 330 with negative refractive power having a convex object-side surface 331 and a concave image-side surface 332 on which at least one inflection point is formed, the object-side and image-side surfaces 331 and 332 thereof being aspheric; wherein a stop 340 is disposed between an imaged object and the first lens element 300; wherein an IR filter 350 is disposed between the image-side surface 332 of the fourth lens element 330 and an image plane 370 and a cover glass 360 is disposed between the IR filter 350 and the image plane 370; and wherein the IR filter 350 and the cover glass 360 are made of glass and have no influence on the focal length of the image-capturing lens assembly.

The equation of the aspheric surface profiles of the third embodiment has the same form as that of the first embodiment.

In the third embodiment of the present image-capturing lens assembly, the focal length of the image-capturing lens assembly is f, and it satisfies the relation: f=6.14 (mm).

In the third embodiment of the present image-capturing lens assembly, the f-number of the image-capturing lens assembly is Fno, and it satisfies the relation: Fno=2.83.

In the third embodiment of the present image-capturing lens assembly, half of the maximal field of view of the image-capturing lens assembly is HFOV, and it satisfies the relation: HFOV=30.7 deg.

In the third embodiment of the present image-capturing lens assembly, the focal length of the image-capturing lens assembly is f, the focal length of the first lens element 300 is f1, and they satisfy the relation: f/f1=1.16.

In the third embodiment of the present image-capturing lens assembly, the focal length of the image-capturing lens assembly is f, the focal length of the third lens element 320 is f3, and they satisfy the relation: f/f3=0.72.

In the third embodiment of the present image-capturing lens assembly, the focal length of the image-capturing lens assembly is f, the focal length of the fourth lens element 330 is f4, and they satisfy the relation: f/f4=−0.25.

In the third embodiment of the present image-capturing lens assembly, the refractive index of the first lens element 300 is N1, the refractive index of the second lens element 310 is N2, and they satisfy the relation: |N1−N2|=0.089.

In the third embodiment of the present image-capturing lens assembly, the thickness of the third lens element 320 near the optical axis is CT3, the focal length of the image-capturing lens assembly is f, and they satisfy the relation: (CT3/f)*100=13.3.

In the third embodiment of the present image-capturing lens assembly, the Abbe number of the first lens element 300 is V1, the Abbe number of the second lens element 310 is V2, and they satisfy the relation: V1−V2=33.1.

In the third embodiment of the present image-capturing lens assembly, the radius of curvature of the object-side surface 301 of the first lens element 300 is R1, the focal length of the image-capturing lens assembly is f, and they satisfy the relation: R1/f=0.41.

In the third embodiment of the present image-capturing lens assembly, the thickness of the second lens element 310 near the optical axis is CT2, the focal length of the image-capturing lens assembly is f, the total track length of the image-capturing lens assembly is TTL, and they satisfy the relation: (CT2/f) TTL=0.96 mm.

In the third embodiment of the present image-capturing lens assembly, the distance near the optical axis between the stop 340 and the image plane 370 is SL, the total track length of the image-capturing lens assembly is TTL, and they satisfy the relation: SL/TTL=0.98.

In the third embodiment of the present image-capturing lens assembly, the image plane 370 is provided with an electronic sensor on which an object is imaged. The distance near the optical axis between the object-side surface 301 of the first lens element 300 and the image-side surface 332 of the fourth lens element 330 is Td, half of the diagonal length of the effective pixel area of the electronic sensor is ImgH, the focal length of the image-capturing lens assembly is f, and they satisfy the relation: (Td/ImgH)*f=7.67 mm.

In the third embodiment of the present image-capturing lens assembly, the distance near the optical axis between the first lens element 300 and the second lens element 310 is T12, the focal length of the image-capturing lens assembly is f, and they satisfy the relation: (T12/f)*100=6.7.

In the third embodiment of the present image-capturing lens assembly, the radius of curvature of the object-side surface 311 of the second lens element 310 is R3, the radius of curvature of the image-side surface 312 of the second lens element 310 is R4, and they satisfy the relation: R3/R4=5.66.

In the third embodiment of the present image-capturing lens assembly, the image plane 370 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=2.08.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

Figure 4A:
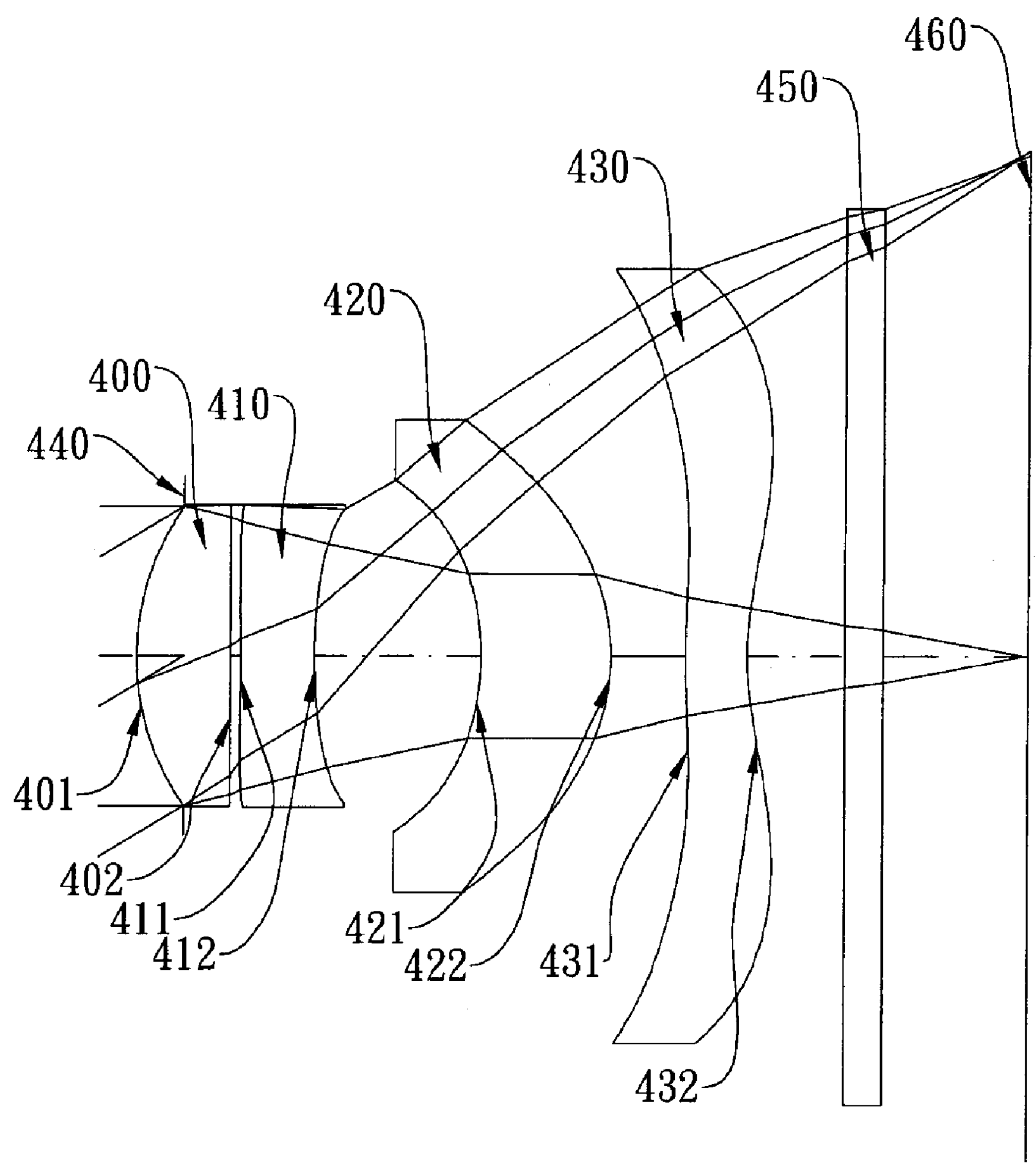
FIG. 4A shows an image-capturing lens assembly in accordance with a fourth embodiment of the present invention.
Figure 4B:
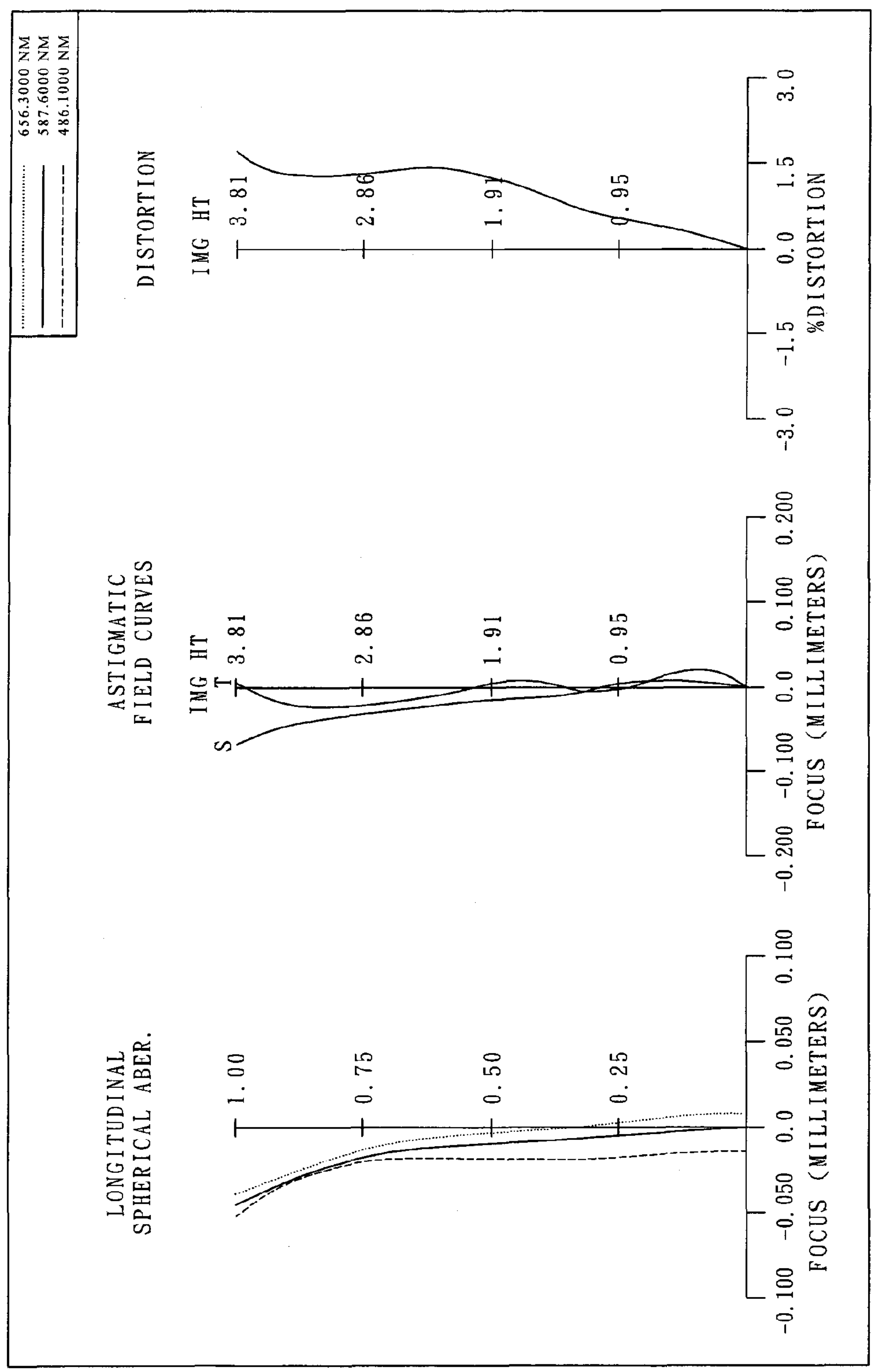
FIG. 4B shows the aberration curves of the fourth embodiment of the present invention.

FIG. 4A shows an image-capturing lens assembly in accordance with a fourth embodiment of the present invention, and FIG. 4B shows the aberration curves of the fourth embodiment of the present invention. The image-capturing lens assembly of the fourth embodiment of the present invention mainly comprises four lens elements, in order from the object side to the image side: a plastic first lens element 400 with positive refractive power having a convex object-side surface 401 and a concave image-side surface 402, the object-side and image-side surfaces 401 and 402 thereof being aspheric; a plastic second lens element 410 with negative refractive power having a concave object-side surface 411 and a concave image-side surface 412, the object-side and image-side surfaces 411 and 412 thereof being aspheric; a plastic third lens element 420 with positive refractive power having a concave object-side surface 421 and a convex image-side surface 422, the object-side and image-side surfaces 421 and 422 thereof being aspheric; and a plastic fourth lens element 430 with negative refractive power having a convex object-side surface 431 and a concave image-side surface 432 on which at least one inflection point is formed, the object-side and image-side surfaces 431 and 432 thereof being aspheric; wherein a stop 440 is disposed between an imaged object and the first lens element 400; wherein an IR filter 450 is disposed between the image-side surface 432 of the fourth lens element 430 and an image plane 460; and wherein the IR filter 450 is made of glass and has no influence on the focal length of the image-capturing lens assembly.

The equation of the aspheric surface profiles of the fourth embodiment has the same form as that of the first embodiment.

In the fourth embodiment of the present image-capturing lens assembly, the focal length of the image-capturing lens assembly is f, and it satisfies the relation: f=6.47 (mm).

In the fourth embodiment of the present image-capturing lens assembly, the f-number of the image-capturing lens assembly is Fno, and it satisfies the relation: Fno=2.85.

In the fourth embodiment of the present image-capturing lens assembly, half of the maximal field of view of the image-capturing lens assembly is HFOV, and it satisfies the relation: HFOV=30.2 deg.

In the fourth embodiment of the present image-capturing lens assembly, the focal length of the image-capturing lens assembly is f, the focal length of the first lens element 400 is f1, and they satisfy the relation: f/f1=1.81.

In the fourth embodiment of the present image-capturing lens assembly, the focal length of the image-capturing lens assembly is f, the focal length of the third lens element 420 is f3, and they satisfy the relation: f/f3=0.93.

In the fourth embodiment of the present image-capturing lens assembly, the focal length of the image-capturing lens assembly is f, the focal length of the fourth lens element 430 is f4, and they satisfy the relation: f/f4=−0.99.

In the fourth embodiment of the present image-capturing lens assembly, the refractive index of the first lens element 400 is N1, the refractive index of the second lens element 410 is N2, and they satisfy the relation: |N1−N2|=0.088.

In the fourth embodiment of the present image-capturing lens assembly, the thickness of the third lens element 420 near the optical axis is CT3, the focal length of the image-capturing lens assembly is f, and they satisfy the relation: (CT3/f)*100=15.7.

In the fourth embodiment of the present image-capturing lens assembly, the Abbe number of the first lens element 400 is V1, the Abbe number of the second lens element 410 is V2, and they satisfy the relation: V1−V2=32.5.

In the fourth embodiment of the present image-capturing lens assembly, the radius of curvature of the object-side surface 401 of the first lens element 400 is R1, the focal length of the image-capturing lens assembly is f, and they satisfy the relation: R1/f=0.29.

In the fourth embodiment of the present image-capturing lens assembly, the thickness of the second lens element 410 near the optical axis is CT2, the focal length of the image-capturing lens assembly is f, the total track length of the image-capturing lens assembly is TTL, and they satisfy the relation: (CT2/f) TTL=0.62 mm.

In the fourth embodiment of the present image-capturing lens assembly, the distance near the optical axis between the stop 440 and the image plane 460 is SL, the total track length of the image-capturing lens assembly is TTL, and they satisfy the relation: SL/TTL=0.95.

In the fourth embodiment of the present image-capturing lens assembly, the image plane 460 is provided with an electronic sensor on which an object is imaged. The distance near the optical axis between the object-side surface 401 of the first lens element 400 and the image-side surface 432 of the fourth lens element 430 is Td, half of the diagonal length of the effective pixel area of the electronic sensor is ImgH, the focal length of the image-capturing lens assembly is f, and they satisfy the relation: (Td/ImgH)*f=8.12 mm.

In the fourth embodiment of the present image-capturing lens assembly, the distance near the optical axis between the first lens element 400 and the second lens element 410 is T12, the focal length of the image-capturing lens assembly is f, and they satisfy the relation: (T12/f)*100=1.3.

In the fourth embodiment of the present image-capturing lens assembly, the radius of curvature of the object-side surface 411 of the second lens element 410 is R3, the radius of curvature of the image-side surface 412 of the second lens element 410 is R4, and they satisfy the relation: R3/R4=−12.33.

In the fourth embodiment of the present image-capturing lens assembly, the image plane 460 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=1.81.

The detailed optical data of the fourth embodiment is shown in FIG. 13 (TABLE 7), and the aspheric surface data is shown in FIG. 14 (TABLE 8), wherein the units of the radius of curvature, the thickness and the focal length are expressed in mm, and HFOV is half of the maximal field of view.

Figure 5A:
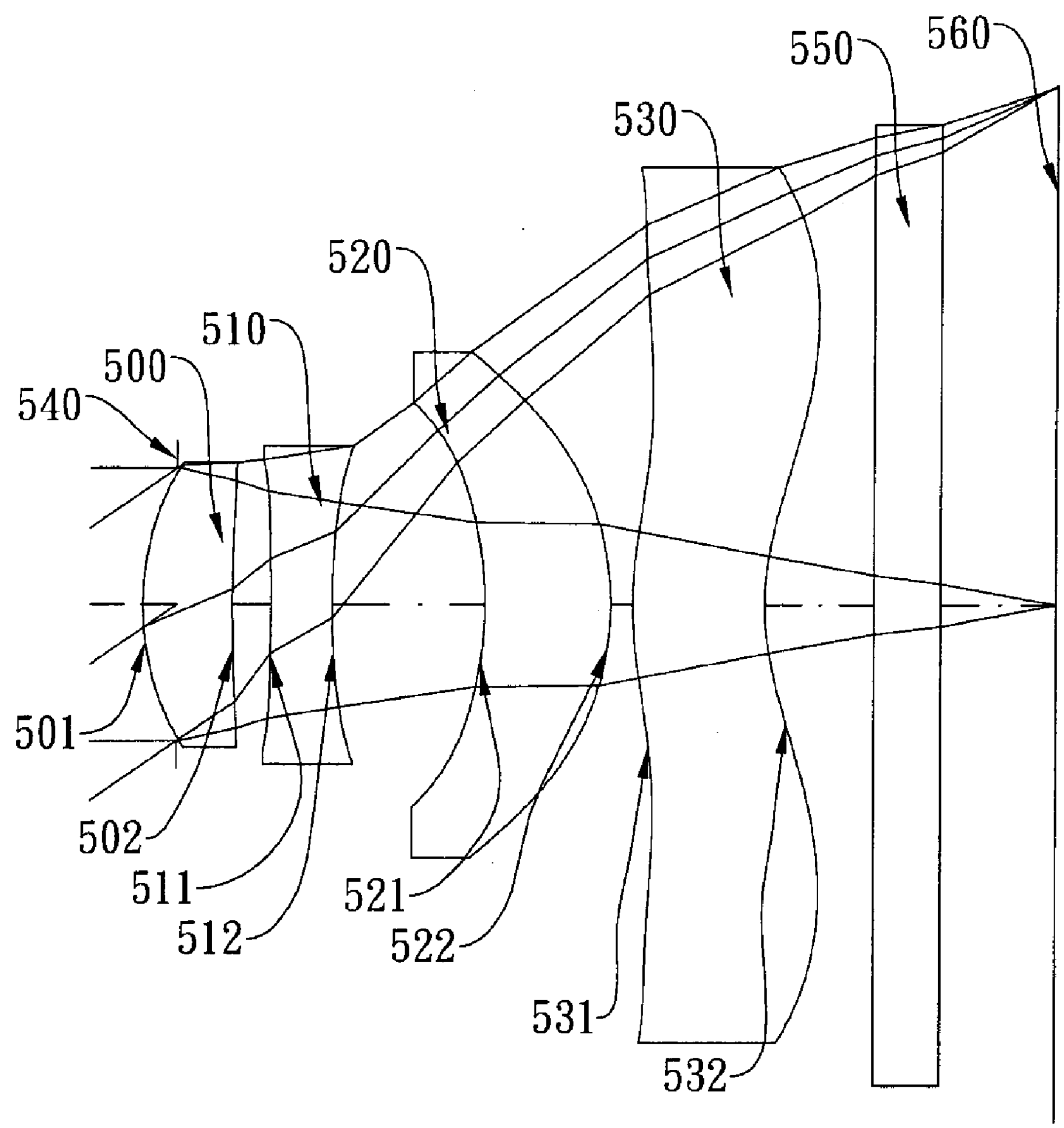
FIG. 5A shows an image-capturing lens assembly in accordance with a fifth embodiment of the present invention.
Figure 5B:
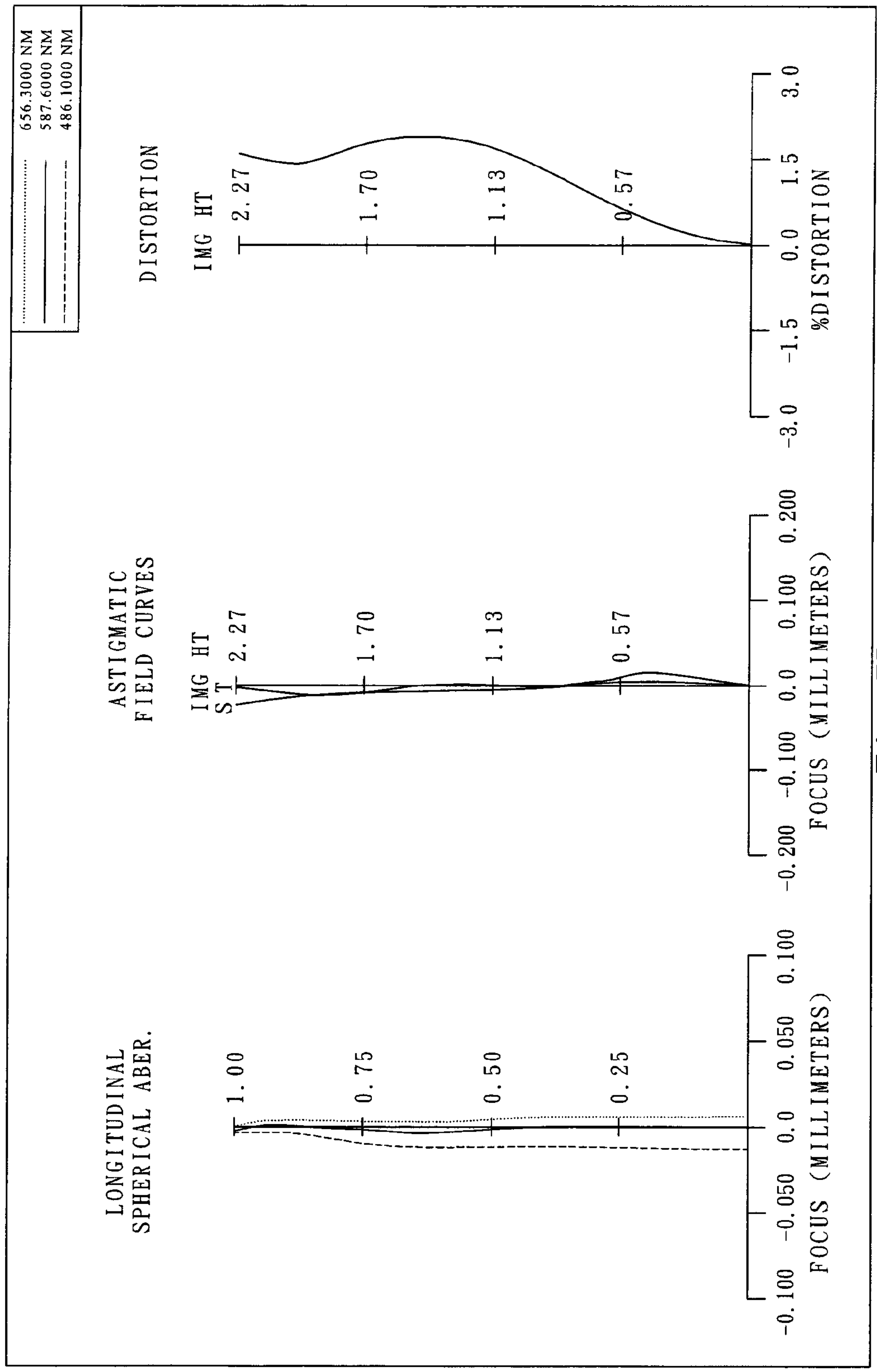
FIG. 5B shows the aberration curves of the fifth embodiment of the present invention.

FIG. 5A shows an image-capturing lens assembly in accordance with a fifth embodiment of the present invention, and FIG. 5B shows the aberration curves of the fifth embodiment of the present invention. The image-capturing lens assembly of the fifth embodiment of the present invention mainly comprises four lens elements, in order from the object side to the image side: a plastic first lens element 500 with positive refractive power having a convex object-side surface 501 and a concave image-side surface 502, the object-side and image-side surfaces 501 and 502 thereof being aspheric; a plastic second lens element 510 with negative refractive power having a concave object-side surface 511 and a concave image-side surface 512, the object-side and image-side surfaces 511 and 512 thereof being aspheric; a plastic third lens element 520 with positive refractive power having a concave object-side surface 521 and a convex image-side surface 522, the object-side and image-side surfaces 521 and 522 thereof being aspheric; and a plastic fourth lens element 530 with negative refractive power having a convex object-side surface 531 and a concave image-side surface 532 on which at least one inflection point is formed, the object-side and image-side surfaces 531 and 532 thereof being aspheric; wherein a stop 540 is disposed between an imaged object and the first lens element 500; wherein an IR filter 550 is disposed between the image-side surface 532 of the fourth lens element 530 and an image plane 560; and wherein the IR filter 550 is made of glass and has no influence on the focal length of the image-capturing lens assembly.

The equation of the aspheric surface profiles of the fifth embodiment has the same form as that of the first embodiment.

In the fifth embodiment of the present image-capturing lens assembly, the focal length of the image-capturing lens assembly is f, and it satisfies the relation: f=3.41 (mm).

In the fifth embodiment of the present image-capturing lens assembly, the f-number of the image-capturing lens assembly is Fno, and it satisfies the relation: Fno=2.85.

In the fifth embodiment of the present image-capturing lens assembly, half of the maximal field of view of the image-capturing lens assembly is HFOV, and it satisfies the relation: HFOV=33.3 deg.

In the fifth embodiment of the present image-capturing lens assembly, the focal length of the image-capturing lens assembly is f, the focal length of the first lens element 500 is f1, and they satisfy the relation: f/f1=1.36.

In the fifth embodiment of the present image-capturing lens assembly, the focal length of the image-capturing lens assembly is f, the focal length of the third lens element 520 is f3, and they satisfy the relation: f/f3=0.49.

In the fifth embodiment of the present image-capturing lens assembly, the focal length of the image-capturing lens assembly is f, the focal length of the fourth lens element 530 is f4, and they satisfy the relation: f/f4=−0.27.

In the fifth embodiment of the present image-capturing lens assembly, the refractive index of the first lens element 500 is N1, the refractive index of the second lens element 510 is N2, and they satisfy the relation: |N1−N2|=0.088.

In the fifth embodiment of the present image-capturing lens assembly, the thickness of the third lens element 520 near the optical axis is CT3, the focal length of the image-capturing lens assembly is f, and they satisfy the relation: (CT3/f)*100=16.8.

In the fifth embodiment of the present image-capturing lens assembly, the Abbe number of the first lens element 500 is V1, the Abbe number of the second lens element 510 is V2, and they satisfy the relation: V1−V2=32.5.

In the fifth embodiment of the present image-capturing lens assembly, the radius of curvature of the object-side surface 501 of the first lens element 500 is R1, the focal length of the image-capturing lens assembly is f, and they satisfy the relation: R1/f=0.35.

In the fifth embodiment of the present image-capturing lens assembly, the thickness of the second lens element 510 near the optical axis is CT2, the focal length of the image-capturing lens assembly is f, the total track length of the image-capturing lens assembly is TTL, and they satisfy the relation: (CT2/f) TTL=0.33 mm.

In the fifth embodiment of the present image-capturing lens assembly, the distance near the optical axis between the stop 540 and the image plane 560 is SL, the total track length of the image-capturing lens assembly is TTL, and they satisfy the relation: SL/TTL=0.96.

In the fifth embodiment of the present image-capturing lens assembly, the image plane 560 is provided with an electronic sensor on which an object is imaged. The distance near the optical axis between the object-side surface 501 of the first lens element 500 and the image-side surface 532 of the fourth lens element 530 is Td, half of the diagonal length of the effective pixel area of the electronic sensor is ImgH, the focal length of the image-capturing lens assembly is f, and they satisfy the relation: (Td/ImgH)*f=4.25 mm.

In the fifth embodiment of the present image-capturing lens assembly, the distance near the optical axis between the first lens element 500 and the second lens element 510 is T12, the focal length of the image-capturing lens assembly is f, and they satisfy the relation: (T12/f)*100=5.1.

In the fifth embodiment of the present image-capturing lens assembly, the radius of curvature of the object-side surface 511 of the second lens element 510 is R3, the radius of curvature of the image-side surface 512 of the second lens element 510 is R4, and they satisfy the relation: R3/R4=−3.29.

In the fifth embodiment of the present image-capturing lens assembly, the image plane 560 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=1.79.

The detailed optical data of the fifth embodiment is shown in FIG. 15 (TABLE 9), and the aspheric surface data is shown in FIG. 16 (TABLE 10), wherein the units of the radius of curvature, the thickness and the focal length are expressed in mm, and HFOV is half of the maximal field of view.

Figure 6A:
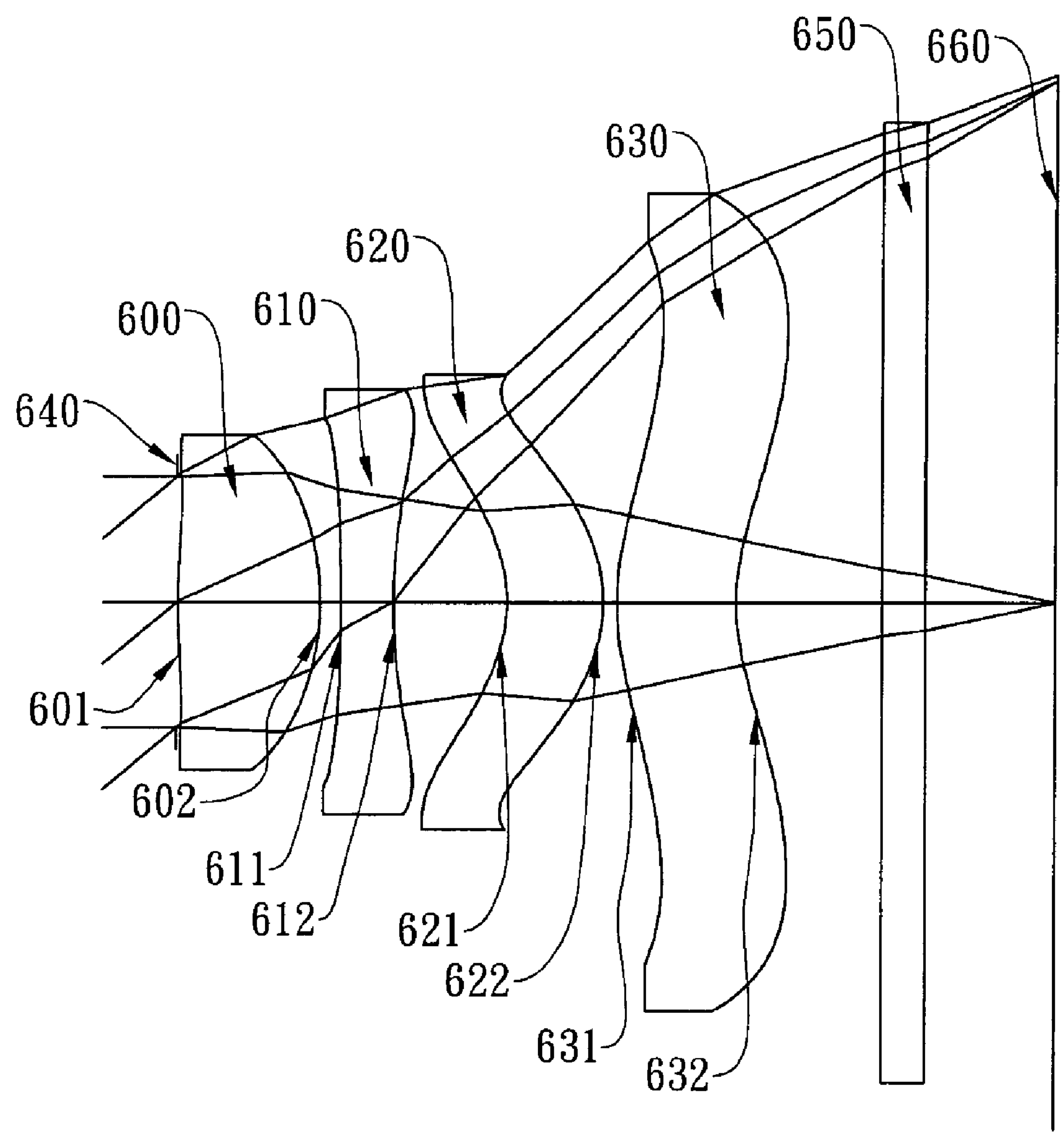
FIG. 6A shows an image-capturing lens assembly in accordance with a sixth embodiment of the present invention.
Figure 6B:
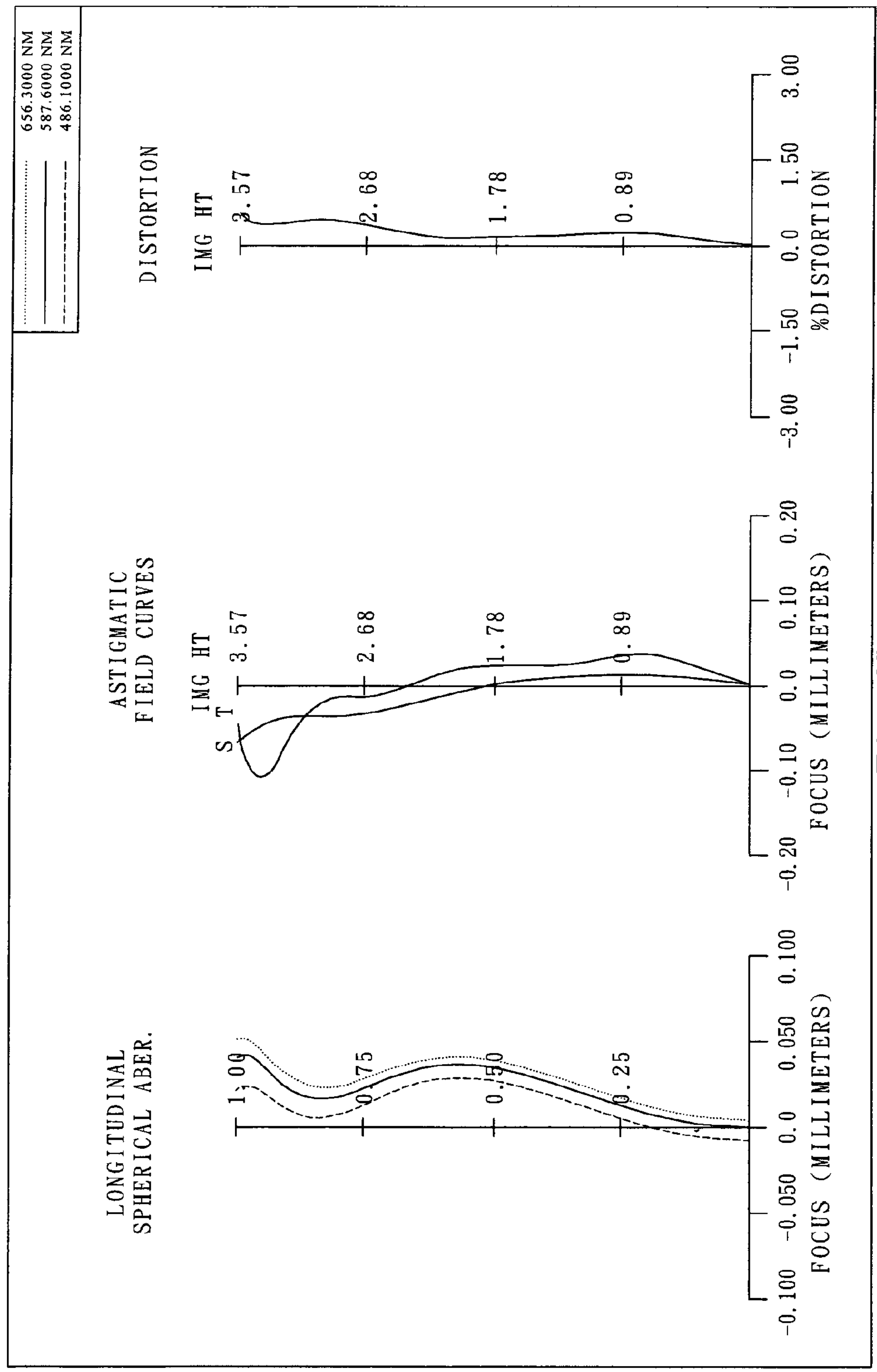
FIG. 6B shows the aberration curves of the sixth embodiment of the present invention.

FIG. 6A shows an image-capturing lens assembly in accordance with a sixth embodiment of the present invention, and FIG. 6B shows the aberration curves of the sixth embodiment of the present invention. The image-capturing lens assembly of the sixth embodiment of the present invention mainly comprises four lens elements, in order from the object side to the image side: a plastic first lens element 600 with positive refractive power having a convex object-side surface 601 and a convex image-side surface 602, the object-side and image-side surfaces 601 and 602 thereof being aspheric; a plastic second lens element 610 with negative refractive power having a concave object-side surface 611 and a concave image-side surface 612, the object-side and image-side surfaces 611 and 612 thereof being aspheric; a plastic third lens element 620 with positive refractive power having a concave object-side surface 621 and a convex image-side surface 622, the object-side and image-side surfaces 621 and 622 thereof being aspheric; and a plastic fourth lens element 630 with negative refractive power having a convex object-side surface 631 and a concave image-side surface 632 on which at least one inflection point is formed, the object-side and image-side surfaces 631 and 632 thereof being aspheric; wherein a stop 640 is disposed between an imaged object and the first lens element 600; wherein an IR filter 650 is disposed between the image-side surface 632 of the fourth lens element 630 and an image plane 660; and wherein the IR filter 650 is made of glass and has no influence on the focal length of the image-capturing lens assembly.

The equation of the aspheric surface profiles of the sixth embodiment has the same form as that of the first embodiment.

In the sixth embodiment of the present image-capturing lens assembly, the focal length of the image-capturing lens assembly is f, and it satisfies the relation: f=4.23 (mm).

In the sixth embodiment of the present image-capturing lens assembly, the f-number of the image-capturing lens assembly is Fno, and it satisfies the relation: Fno=2.44.

In the sixth embodiment of the present image-capturing lens assembly, half of the maximal field of view of the image-capturing lens assembly is HFOV, and it satisfies the relation: HFOV=40.1 deg.

In the sixth embodiment of the present image-capturing lens assembly, the focal length of the image-capturing lens assembly is f, the focal length of the first lens element 600 is f1, and they satisfy the relation: f/f1=1.56.

In the sixth embodiment of the present image-capturing lens assembly, the focal length of the image-capturing lens assembly is f, the focal length of the third lens element 620 is f3, and they satisfy the relation: f/f3=0.36.

In the sixth embodiment of the present image-capturing lens assembly, the focal length of the image-capturing lens assembly is f, the focal length of the fourth lens element 630 is f4, and they satisfy the relation: f/f4=–0.08.

In the sixth embodiment of the present image-capturing lens assembly, the refractive index of the first lens element 600 is N1, the refractive index of the second lens element 610 is N2, and they satisfy the relation: |N1–N2|=0.088.

In the sixth embodiment of the present image-capturing lens assembly, the thickness of the third lens element 620 near the optical axis is CT3, the focal length of the image-capturing lens assembly is f, and they satisfy the relation: (CT3/f)*100=15.3.

In the sixth embodiment of the present image-capturing lens assembly, the Abbe number of the first lens element 600 is V1, the Abbe number of the second lens element 610 is V2, and they satisfy the relation: V1–V2=32.5.

In the sixth embodiment of the present image-capturing lens assembly, the radius of curvature of the object-side surface 601 of the first lens element 600 is R1, the focal length of the image-capturing lens assembly is f, and they satisfy the relation: R1/f=1.34.

In the sixth embodiment of the present image-capturing lens assembly, the thickness of the second lens element 610 near the optical axis is CT2, the focal length of the image-capturing lens assembly is f, the total track length of the image-capturing lens assembly is TTL, and they satisfy the relation: (CT2/f) TTL=0.49 mm.

In the sixth embodiment of the present image-capturing lens assembly, the distance near the optical axis between the stop 640 and the image plane 660 is SL, the total track length of the image-capturing lens assembly is TTL, and they satisfy the relation: SL/TTL=1.00.

In the sixth embodiment of the present image-capturing lens assembly, the image plane 660 is provided with an electronic sensor on which an object is imaged. The distance near the optical axis between the object-side surface 601 of the first lens element 600 and the image-side surface 632 of the fourth lens element 630 is Td, half of the diagonal length of the effective pixel area of the electronic sensor is ImgH, the focal length of the image-capturing lens assembly is f, and they satisfy the relation: (Td/ImgH)*f=4.51 mm.

In the sixth embodiment of the present image-capturing lens assembly, the distance near the optical axis between the first lens element 600 and the second lens element 610 is T12, the focal length of the image-capturing lens assembly is f, and they satisfy the relation: (T12/f)*100=3.4.

In the sixth embodiment of the present image-capturing lens assembly, the radius of curvature of the object-side surface 611 of the second lens element 610 is R3, the radius of curvature of the image-side surface 612 of the second lens element 610 is R4, and they satisfy the relation: R3/R4=–3.42.

In the sixth embodiment of the present image-capturing lens assembly, the image plane 660 is provided with an electronic sensor on which an object is imaged. The total track length of the image-capturing lens assembly is TTL, half of the diagonal length of the effective pixel area of the electronic sensor is ImgH, and they satisfy the relation: TTL/ImgH=1.65.

The detailed optical data of the sixth embodiment is shown in FIG. 17 (TABLE 11), and the aspheric surface data is shown in FIGS. 18A and 18B (TABLES 12A and 12B), wherein the units of the radius of curvature, the thickness and the focal length are expressed in mm, and HFOV is half of the maximal field of view.

It is to be noted that TABLES 1-12 (illustrated in FIGS. 7-18 respectively) show different data of the different embodiments, however, the data of the different embodiments are obtained from experiments. Therefore, any image-capturing lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 19) shows the data of the respective embodiments resulting from the equations.

What is claimed is:

1. An image-capturing lens assembly comprising, in order from an object side to an image side:

a first lens element with positive refractive power having a convex object-side surface;

a second lens element with negative refractive power;

a third lens element with positive refractive power having a concave object-side surface and a convex image-side surface, the object-side and image-side surfaces thereof being aspheric;

a fourth lens element with negative refractive power having a concave image-side surface on which at least one inflection point is formed, the object-side and image-side surfaces thereof being aspheric; and a stop disposed between an imaged object and the first lens element; wherein there are four lens elements with refractive power; and wherein a focal length of the image-capturing lens assembly is f, a focal length of the third lens element is f3, a focal length of the fourth lens element is f4, a refractive index of the first lens element is N1, a refractive index of the second lens element is N2, a thickness of the second lens element near the optical axis is CT2, a thickness of the third lens element near the optical axis is $CT3$, an Abbe number of the first lens element is $V1$, an Abbe number of the second lens element is $V2$, a radius of curvature of the object-side surface of the first lens element is $R1$, a total track length of the image-capturing lens assembly is TTL, a distance near the optical axis between the stop and an image plane is SL, and they satisfy the relations: $0.00<f/f3<0.95$, $-1.00<f/f4<-0.01$, $|N1-N2|<0.12$, $3.0<(CT3/f)*100<20.0$, $30.5<V1-V2<42.0$, $0.20<R1/f<0.60$, $0.20\ mm<(CT2/f)*TTL<0.73\ mm$, $0.93<SL/TTL<1.07$.

2. The image-capturing lens assembly according to claim 1, wherein the second lens element has a concave image-side surface.

3. The image-capturing lens assembly according to claim 2 further comprising an electronic sensor on which an object is imaged, wherein an distance near the optical axis between the object-side surface of the first lens element and the image-side surface of the fourth lens element is Td, half of the diagonal length of the effective pixel area of the electronic sensor is ImgH, the focal length of the image-capturing lens assembly is f, and they satisfy the relation: $(Td/ImgH)*f<5.2\ mm$.

4. The image-capturing lens assembly according to claim 2, wherein the second lens element has a concave object-side surface and the fourth lens element has a convex object-side surface.

5. The image-capturing lens assembly according to claim 4, wherein the thickness of the second lens element near the optical axis is $CT2$, the focal length of the image-capturing lens assembly is f, the total track length of the image-capturing lens assembly is TTL, and they satisfy the relation: $0.25\ mm<(CT2/f)*TTL<0.45\ mm$.

6. The image-capturing lens assembly according to claim 4, wherein a radius of curvature of the object-side surface of the second lens element is $R3$, a radius of curvature of the image-side surface of the second lens element is $R4$, and they satisfy the relation: $R3/R4<-1.2$.

7. The image-capturing lens assembly according to claim 2, wherein the focal length of the image-capturing lens assembly is f, a focal length of the first lens element is $f1$, and they satisfy the relation: $1.25<f/f1<2.00$.

8. The image-capturing lens assembly according to claim 7, wherein the focal length of the image-capturing lens assembly is f, the focal length of the first lens element is $f1$, and they satisfy the relation: $1.50<f/f1<1.80$.

9. The image-capturing lens assembly according to claim 2, wherein a distance near the optical axis between the first and second lens elements is $T12$, the focal length of the image-capturing lens assembly is f, and they satisfy the relation: $0.5<(T12/f)*100<6.0$.

10. The image-capturing lens assembly according to claim 2, wherein the radius of curvature of the object-side surface of the first lens element is $R1$, the focal length of the image-capturing lens assembly is f, and they satisfy the relation: $0.20<R1/f<0.40$.

11. The image-capturing lens assembly according to claim 2, wherein the focal length of the image-capturing lens assembly is f, the focal length of the third lens element is $f3$, the focal length of the fourth lens element is $f4$, and they satisfy the relations: $0.20<f/f3<0.80$, $-0.60<f/f4<-0.10$.

12. The image-capturing lens assembly according to claim 1 further comprising an electronic sensor on which an object is imaged, wherein the total track length of the image-capturing lens assembly is TTL, half of the diagonal length of the effective pixel area of the electronic sensor is ImgH, and they satisfy the relation: $TTL/ImgH<2.0$.

13. An image-capturing lens assembly comprising, in order from an object side to an image side:

a first lens element with positive refractive power having a convex object-side surface and a concave image-side surface;

a second lens element with negative refractive power having a concave image-side surface;

a third lens element with positive refractive power having a concave object-side surface and a convex image-side surface, the object-side and image-side surfaces thereof being aspheric;

a fourth lens element with negative refractive power having a concave image-side surface on which at least one inflection point is formed, the object-side and image-side surfaces thereof being aspheric; and a stop disposed between an imaged object and the second lens element; wherein there are four lens elements with refractive power; and wherein a focal length of the image-capturing lens assembly is f, a focal length of the third lens element is $f3$, a focal length of the fourth lens element is $f4$, a refractive index of the first lens element is $N1$, a refractive index of the second lens element is $N2$, and they satisfy the relations: $0.00<f/f3<0.95$, $-1.00<f/f4<-0.01$, $|N1-N2|<0.12$.

14. The image-capturing lens assembly according to claim 13, wherein the second lens element has a concave object-side surface.

15. The image-capturing lens assembly according to claim 14, wherein a distance near the optical axis between the first and second lens elements is $T12$, the focal length of the image-capturing lens assembly is f, and they satisfy the relation: $0.5<(T12/f)*100<6.0$.

16. The image-capturing lens assembly according to claim 14, wherein the focal length of the image-capturing lens assembly is f, the focal length of the third lens element is $f3$, the focal length of the fourth lens element is $f4$, and they satisfy the relations: $0.20<f/f3<0.80$, $-0.60<f/f4<-0.10$.

17. The image-capturing lens assembly according to claim 13, wherein the focal length of the image-capturing lens assembly is f, a focal length of the first lens element is $f1$, and they satisfy the relation: $1.25<f/f1<2.00$.

18. The image-capturing lens assembly according to claim 13, wherein an Abbe number of the first lens element is $V1$, an Abbe number of the second lens element is $V2$, and they satisfy the relation: $30.5<V1-V2<42.0$.

19. The image-capturing lens assembly according to claim 13, wherein a thickness of the third lens element near the optical axis is $CT3$, the focal length of the image-capturing lens assembly is f, and they satisfy the relation: $3.0<(CT3/f)*100<20.0$.

20. The image-capturing lens assembly according to claim 13, wherein a radius of curvature of the object-side surface of the first lens element is $R1$, the focal length of the image-capturing lens assembly is f, and they satisfy the relation: $0.20<R1/f<0.40$.

21. The image-capturing lens assembly according to claim 20 further comprising an electronic sensor on which an object is imaged, wherein a distance near the optical axis between the stop and an image plane is SL, a total track length of the image-capturing lens assembly is TTL, half of the diagonal length of the effective pixel area of the electronic sensor is ImgH, and they satisfy the relations: $0.93<SL/TTL<1.07$, $TTL/ImgH<2.0$.

* * * * *